US012662220B2

(12) United States Patent
Uoshita

(10) Patent No.: US 12,662,220 B2
(45) Date of Patent: Jun. 23, 2026

(54) NAVIGATION PLANNING SYSTEM AND NAVIGATION PLANNING METHOD

(71) Applicant: Furuno Electric Co., Ltd., Nishinomiya-City (JP)

(72) Inventor: Seiichi Uoshita, Nishinomiya city (JP)

(73) Assignee: FURUNO ELECTRIC CO., LTD., Nishinomiya (JP)

(*) Notice: Subject to any disclaimer, the term of this patent is extended or adjusted under 35 U.S.C. 154(b) by 195 days.

(21) Appl. No.: 18/523,953

(22) Filed: Nov. 30, 2023

(65) Prior Publication Data

US 2025/0178701 A1 Jun. 5, 2025

(51) Int. Cl.
*G08G 3/02* (2006.01)
*B63B 43/18* (2006.01)
(Continued)

(52) U.S. Cl.
CPC .............. *B63B 43/18* (2013.01); *B63B 49/00* (2013.01); *G08G 3/02* (2013.01); *B63B 51/00* (2013.01);
(Continued)

(58) Field of Classification Search
CPC ......... B63B 43/18; B63B 43/00; B63B 49/00; B63B 51/00; B63B 2213/00;
(Continued)

(56) References Cited

U.S. PATENT DOCUMENTS 11,735,054 B1 * 8/2023 Ryan ........................ G08G 3/02
340/984
11,915,594 B2 * 2/2024 Mansor .................... G08G 3/02
(Continued)

FOREIGN PATENT DOCUMENTS

CN 118230602 B * 6/2025 ............. G06F 16/29
EP 3729407 B1 * 7/2022 ............... G08G 3/02
(Continued)

OTHER PUBLICATIONS

Liu, Dongdong, and Guoyou Shi. "Ship collision risk assessment based on collision detection algorithm." IEEE Access 8 (2020): 161969-161980. (Year: 2020).*
(Continued)

*Primary Examiner* — Cuong H Nguyen
(74) *Attorney, Agent, or Firm* — XSENSUS LLP

(57) ABSTRACT

A navigation planning system configured to acquire a planned route for a movable body on a water. Further, movable body information and obstacle information an obstacle located in a surrounding area of the movable body is acquired. Subsequently, an evasion route, different from the planned route is acquired. Further, a collision risk indicating a risk of collision between the movable body and the obstacle is calculated based on the movable body information and obstacle information. Furthermore, a maximum evasion route collision risk when the movable body travels on the evasion route and a maximum planned route collision risk the movable body travels on the planned route are obtained. Finally, the navigation planning system outputs a navigation route change signal indicating that the movable body change the planned route to the evasion route when the maximum evasion route collision risk is less than the maximum planned route collision risk.

13 Claims, 22 Drawing Sheets

(51) Int. Cl.

| | | |
|---|---|---|
| *B63B 49/00* | (2006.01) | |
| *B63B 51/00* | (2006.01) | |
| *G01S 13/92* | (2006.01) | |
| *G01S 13/937* | (2020.01) | |
| *G08G 1/16* | (2006.01) | |
| *G08G 5/80* | (2025.01) | |

(52) U.S. Cl.
CPC .............. *G01S 13/92* (2013.01); *G01S 13/937* (2020.01); *G08G 1/166* (2013.01); *G08G 5/80* (2025.01)

(58) Field of Classification Search
CPC ..... B63B 2213/02; G08G 3/02; G01S 13/917; G01S 13/92
USPC .................................................. 701/300–302
See application file for complete search history.

(56) References Cited

U.S. PATENT DOCUMENTS

| | | | | |
|---|---|---|---|---|
| 12,448,095 | B2 * | 10/2025 | Uoshita .................... | G08G 3/02 |
| 2020/0035106 | A1 | 1/2020 | Suzuki et al. | |
| 2020/0310434 | A1 | 10/2020 | Chung et al. | |
| 2021/0125502 | A1 * | 4/2021 | Mansor .................. | G05D 1/693 |
| 2021/0165932 | A1 * | 6/2021 | Mohan ................ | G06F 11/3698 |
| 2023/0406461 | A1 * | 12/2023 | Uoshita ................... | B63B 49/00 |
| 2024/0116619 | A1 * | 4/2024 | Tomita ................... | B63H 25/06 |
| 2025/0382037 | A1 * | 12/2025 | Tervo ...................... | B63B 43/18 |

FOREIGN PATENT DOCUMENTS

| | | | | | | |
|---|---|---|---|---|---|---|
| EP | | 4290496 | A1 | * | 12/2023 | ............... G08G 3/02 |
| GB | | 2593794 | A | * | 10/2021 | ............. B63H 25/04 |
| JP | | H09-22499 | A | | 1/1997 | |
| KR | | 20190093969 | A | * | 8/2019 | ............. G06N 20/00 |
| KR | | 102099699 | B1 | * | 4/2020 | ............. B63B 43/18 |
| KR | | 20210046500 | A | * | 4/2021 | ............. G06V 20/00 |
| KR | | 20240030736 | A | * | 3/2024 | ............. G05D 1/622 |

| | | | | | | |
|---|---|---|---|---|---|---|
| WO | WO-2017167905 | A1 | * | 10/2017 | ........... G01S 13/865 |
| WO | WO-2019121237 | A1 | * | 6/2019 | .............. G08G 3/02 |
| WO | 2021/149448 | A1 | | 7/2021 | |
| WO | WO-2024262223 | A1 | * | 12/2024 | ............. B63B 43/18 |

OTHER PUBLICATIONS

Ahn, Jin-Hyeong, Key-Pyo Rhee, and Young-Jun You. "A study on the collision avoidance of a ship using neural networks and fuzzy logic." Applied Ocean Research 37 (2012): 162-173. (Year: 2012).*

Liu, Hongdan, Lanyong Zhang, and Sheng Liu. "Modeling of ship collision risk based on cloud model." IEEE Access 8 (2020): 221162-221175. (Year: 2020).*

Cho, Yonghoon, Jungwook Han, and Jinwhan Kim. "Efficient COLREG-compliant collision avoidance in multi-ship encounter situations." IEEE Transactions on Intelligent Transportation Systems 23.3 (2020): 1899-1911. (Year: 2020).*

Lu, Chao-Wei, et al. "Marine collision avoidance route planning model for MASS based on domain-based predicted area of danger." Journal of Marine Science and Engineering 11.9 (2023): 1724. (Year: 2023).*

Li, Mingze, et al. "Optimized APF-ACO algorithm for ship collision avoidance and path planning." Journal of Marine Science and Engineering 11.6 (2023): 1177. (Year: 2023).*

Tran, Hoang Anh, Tor Arne Johansen, and Rudy R. Negenborn. "A collision avoidance algorithm with intention prediction for inland waterways ships." IFAC-PapersOnLine 56.2 (2023): 4337-4343. (Year: 2023).*

Akdağ, Melih, et al. "Hierarchical collision avoidance algorithm with route exchange concept for autonomous and conventional ships." Authorea Preprints (2023). (Year: 2023).*

Extended European search report issued on May 14, 2024, in corresponding European patent Application No. 23211996.6, 8 pages.

Extended European search report issued on May 14, 2024, in corresponding European patent Application No. 23211993.3, 6 pages.

* cited by examiner

Figure 16:
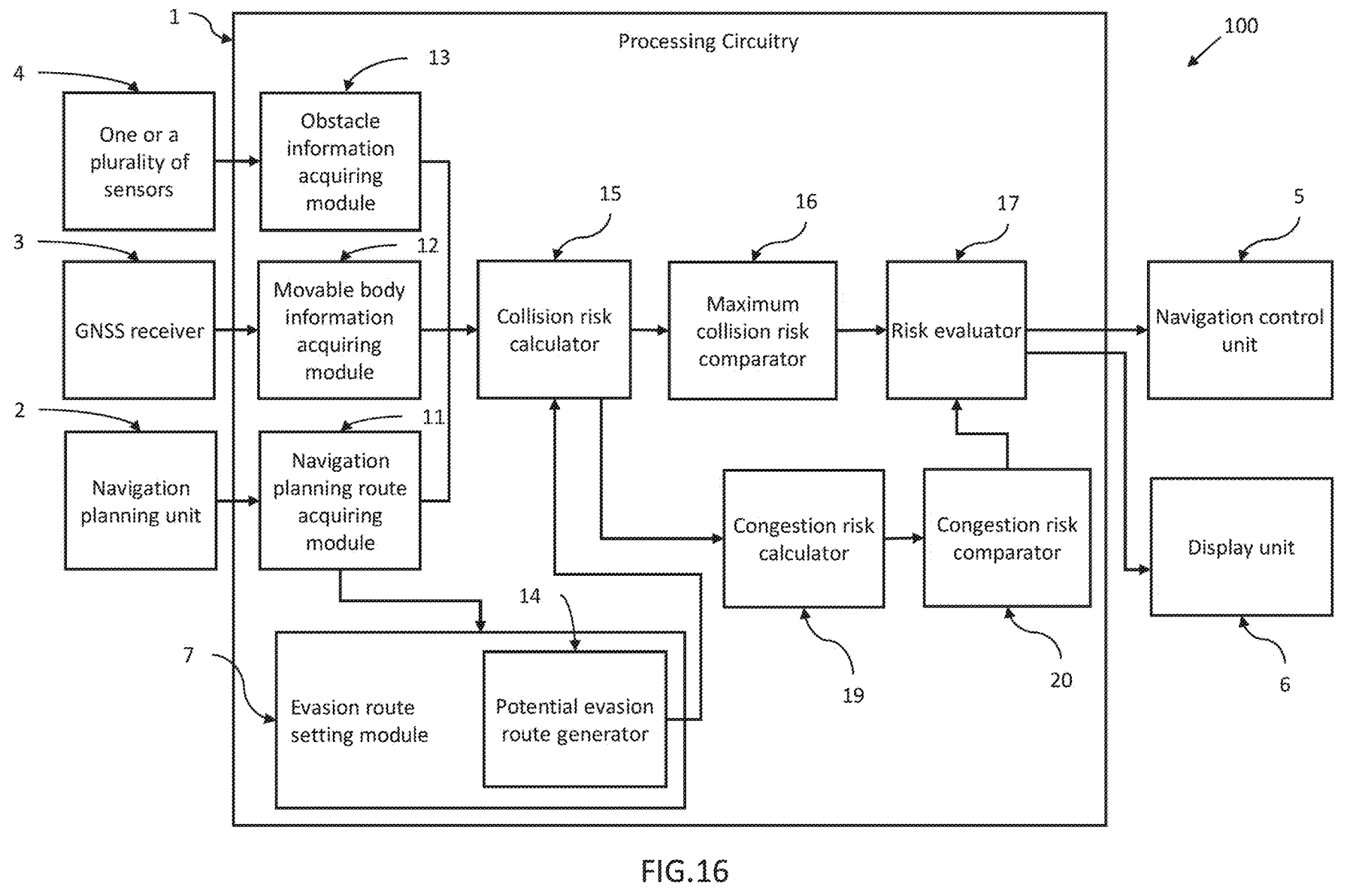

100

Navigation control unit — 5

Display unit — 6

Processing Circuitry

Risk evaluator — 17

Congestion risk comparator — 20

Maximum collision risk comparator — 16

Congestion risk calculator — 19

Collision risk calculator — 15

Potential evasion route generator — 14

Obstacle information acquiring module — 13

Movable body information acquiring module — 12

Navigation planning route acquiring module — 11

Evasion route setting module — 7

One or a plurality of sensors — 4

GNSS receiver — 3

Navigation planning unit — 2

Original planned route and set evasion route (2.)

Predetermined range

Congestion risk of set evasion route

Congestion risk of planned route

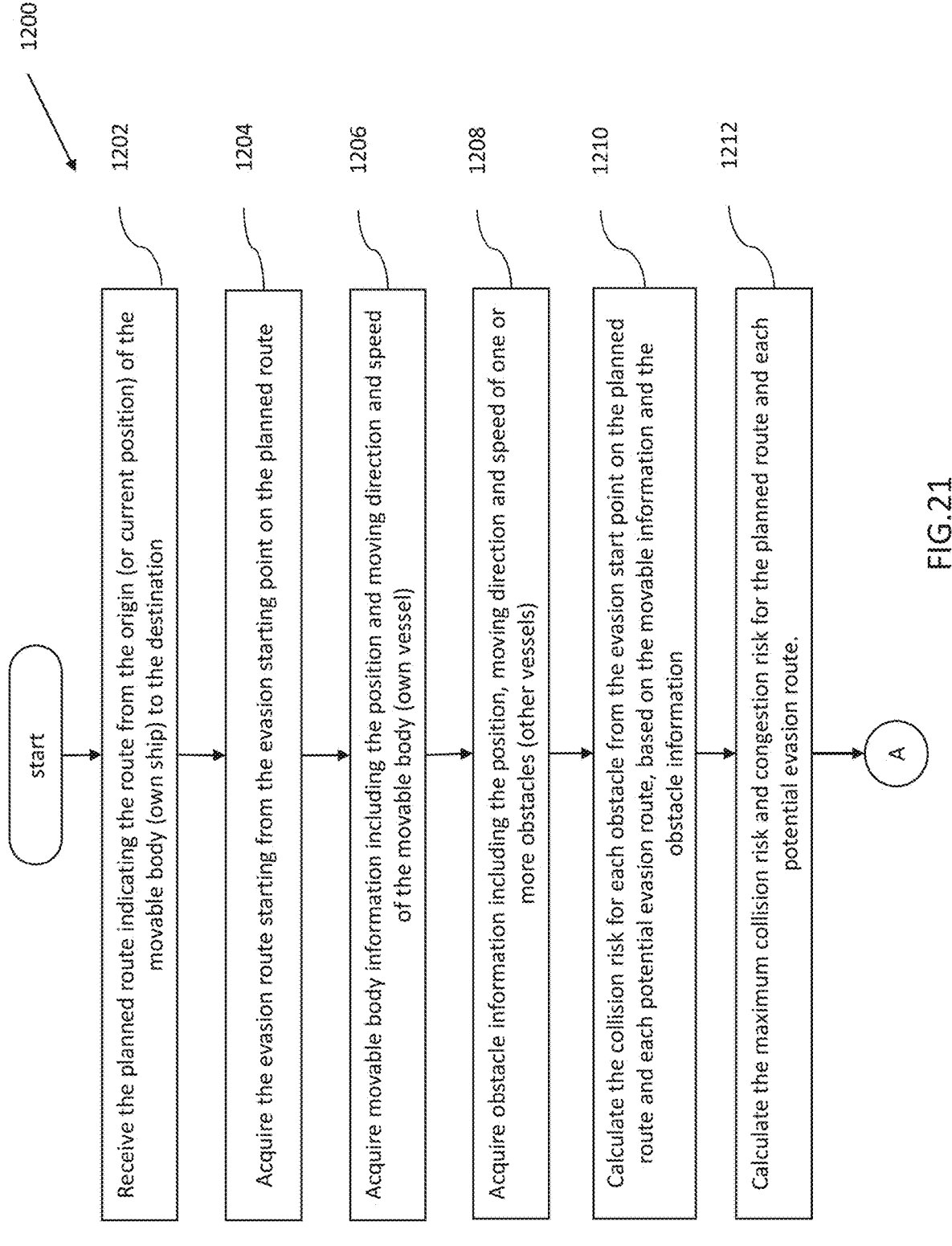

1200

1202 Receive the planned route indicating the route from the origin (or current position) of the movable body (own ship) to the destination 1204 Acquire the evasion route starting from the evasion starting point on the planned route 1206 Acquire movable body information including the position and moving direction and speed of the movable body (own vessel)

1208 Acquire obstacle information including the position, moving direction and speed of one or more obstacles (other vessels)

1210 Calculate the collision risk for each obstacle from the evasion start point on the planned route and each potential evasion route, based on the movable information and the obstacle information 1212 Calculate the maximum collision risk and congestion risk for the planned route and each potential evasion route.

start

NAVIGATION PLANNING SYSTEM AND NAVIGATION PLANNING METHOD

TECHNICAL FIELD

The present invention relates mainly to a vessel navigation system for safely navigating a vessel, and more specifically to a navigation planning system and a navigation planning method for safely navigating a vessel by avoiding collision with a plurality of obstacles around the vessel.

BACKGROUND

Generally, a vessel or other movable body sets a starting point or a planned route of a voyage from a starting point to a destination point before beginning the voyage. Currently, the movable body such as the vessel may have navigation systems and devices to set the planned route and monitor the planned route in order to navigate the movable body safely.

In these conventional navigation planning systems, in order to avoid collision with other obstacles such as the other vessels, a plurality of sensor units is used to identify movable body information including a position of the movable body itself such as the vessel and a position of the obstacle or other vessels near the vessel which would cross the planned route of the vessel.

SUMMARY

By the way, while navigating a planned route may have to be changed due to artificial factors such as an appearance of obstacles or other vessels in a vicinity that may cross the planned route. Natural factors, such as sudden changes in ocean conditions, tides, and other disturbance factors, may force a change of route from the planned route.

For this reason, a vessel operator must safely navigate the movable body, such as their vessel, along the planned route, avoiding collisions with the surrounding obstacles and the other vessels, and may need assistance navigating ocean conditions and tides. To meet the above requirements, systems, devices, and methods are provided to assist vessel operators in safely navigating the movable body by establishing an evasion route that avoids collisions with the obstacles and the other vessels.

However, in order to enable the vessel operator to safely navigate the vessel, to the vessel operator needs to be able to verify that the evasion route being established and attempting to change routes has a reduced collision risk compared to the planned route. The vessel operator needs to be further desirable to be able to compare a route length of the planned route with that of the evasion route, and to be able to more flexibly choose whether to adopt the evasion operation or not.

A navigation planning system according to the present invention has been developed to solve the above problems. The navigation planning system comprises a processing circuitry configured to acquire planned route information indicating a planned route of a movable body moving on a water. Further, the processing circuitry is configured to acquire movable body information including a position and a moving direction of the movable body. Furthermore, the processing circuitry is configured to acquire obstacle information including a position and a moving direction for each of a plurality of the obstacles located around the movable body.

The processing circuitry is further configured to set an evasion route, different from the planned route, comprising a starting point located on the planned route. Further, the processing circuitry is configured to calculate a collision risk indicating a risk level of collision between the movable body and the obstacle based on the movable body information and obstacle information. Finally, the processing circuitry is configured to evaluate a risk.

The processing circuitry is configured to obtain a maximum evasion route collision risk when the movable body travels on the evasion route and a maximum planned route collision risk when the movable body travels on the planned route. Further, the processing circuitry is configured to compare the maximum evasion route collision risk with the maximum planned route collision risk. Furthermore, the processing circuitry is configured to output a navigation route change signal indicating that the movable body change the planned route to the evasion route when the maximum evasion route collision risk is less than the maximum planned route collision risk.

In the navigation planning system, the processing circuitry is configured to set the evasion route different from the planning route for a part of or an entire unnavigated route of the planning route when the risk evaluator determines the necessity of the evasion route.

In the navigation planning system, the processing circuitry is further configured to generate a plurality of potential evasion routes different from the planned route between an evasion starting point and a return point on the unnavigated route. Further, the processing circuitry is configured to select the evasion route among the potential evasion routes.

In the navigation planning system, the processing circuitry is configured to calculate the maximum evasion route collision risk when the movable body travel along the evasion route from the evasion starting point to the return point. Further, the processing circuitry is configured to select the potential evasion route, as the evasion route, having the maximum evasion route collision risk is the minimum among the plurality of potential evasion routes.

In one embodiment, the evasion starting point may be a current navigational position of the movable body moving on or along the planned route. In another embodiment, the evasion starting point may be any position on the unnavigated route on the planned route. In yet another embodiment, the evasion starting point may be a future position of the movable body calculated from the current navigational position of the movable body moving along the planned route.

The processing circuitry is further configured to calculate a planned route distance when the movable body travels on the planned route starting at the evasion starting point for a predetermined time, and a evasion route distance when the movable body travels on the evasion route starting at the evasion starting point for a predetermined time, respectively. The processing circuitry is further configured to determine whether to output the navigation route change signal based on the comparison result of the planned route distance and the evasion route distance.

In the navigation planning system, the processing circuitry is further configured to calculate a difference between the planned route distance and the evasion route distance, and output the navigation route change signal when the difference is equal to or less than a predetermined value, or calculate the distance ratio based on the evasion route distance to the planned route distance, and output the navigation route change signal when the distance ratio is equal to or less than a predetermined value.

In the navigation planning system, the processing circuitry is further configured to output the navigation route change signal when a difference between the maximum planned route collision risk and the maximum evasion route collision risk is greater than a predetermined value. The processing circuitry is further configured to determine whether to output the navigation route change signal based on the planned route distance and the evasion route distance when the difference between the maximum planned route collision risk and the maximum evasion route collision risk is within the predetermined value.

The movable body information may further include information corresponding to the speed of the movable body, and the obstacle information may further include information corresponding to the speed of the obstacle. The speed of the movable body may be appropriately calculated from changes in the position and direction of movement of the movable body.

The processing circuitry is further configured to calculate a congestion risk indicating a degree of simultaneous proximity of a plurality of obstacles on the collision risk corresponding to each of the obstacle.

The processing circuitry is configured to compare a maximum evasion congestion risk between the evasion starting point on the evasion route and the return point with the maximum planned route congestion risk between the evasion starting point and the return point on the planned route calculated by the congestion risk calculator.

In this navigation planning system, the processing circuitry is configured to instruct to change the navigation route to the evasion route when the maximum evasion route collision risk is less than the maximum planned route collision risk, and the maximum evasion route congestion risk is less than the maximum planned route congestion risk.

The processing circuitry is further configured to calculate the planned route distance when the movable body navigates on the planned route starting from the evasion starting point for the predetermined time, and the evasion route distance when the movable body navigates on the evasion route starting from the evasion starting point for the predetermined time, respectively. The processing circuitry is further configured to determine the necessity of the navigation route change signal based on the comparison of the planned route distance and the evasion route distance.

In the navigation planning system, the processing circuitry is configured to calculate the planned route distance between the evasion starting point and the return point on the planned route when the movable body travels on the planned route, and the evasion route distance between evasion starting point and the return point when the movable body travels on the evasion route, respectively. The processing circuitry is further configured to determine whether to output the navigation route change signal based on the comparison of the planned route distance and the evasion route distance.

Further, the processing circuitry is configured to obtain the planned route distance and the evasion route distance, and outputs the navigation route change signal when the difference is equal to or less than a predetermined value. The processing circuitry is further configured to calculate the distance ratio of the evasion route distance and the planned route distance, and outputs the navigation route change signal when the distance ratio is equal to or less than a predetermined value.

In the navigation planning system, the processing circuitry is configured to output the navigation route change signal when the maximum collision risk is equal to or less than a predetermined value. Further, the processing circuitry is configured to determine whether to output the navigation route change signal based on the planned route distance and the evasion route distance when the maximum collision risk is within a predetermined base a second large range.

The processing circuitry is further configured to calculate a maximum planned route congestion risk. The planned route congestion risk is calculated based on a value of a logical sum of a plurality of the collision risks including the maximum collision risk among the plurality of the collision risks. Alternatively, the processing circuitry is configured to calculate the planned route congestion risk based on the value of the logical sum of the plurality of the collision risks excluding the maximum collision risk among the plurality of the collision risks.

In the navigation planning system, the processing circuitry is configured to calculate the congestion risk based on the collision risk corresponding to the selected plurality of the obstacles among the plurality of the obstacles corresponding to the obstacle information acquired by the obstacle information acquiring module. The processing circuitry is further configured to calculate the congestion risk based on the collision risk corresponding to each of the obstacles in a group of a second large maximum collision risk including the obstacle corresponding to the second large maximum collision risk of the collision risk next to the maximum collision risk and the obstacle having the collision risk less than the second large maximum collision risk. Further, the processing circuitry is configured to calculate a planned route congestion risk and an evasion route congestion risk based on the values of the logical sum of the collision risks.

In the navigation planning system of the present invention, the processing circuitry is configured to calculate the maximum collision risk when the movable body navigates on each potential evasion route from a plurality of potential evasion routes, and the evasion route selection unit may select the potential evasion route as the evasion route based on the maximum collision risk.

Further, in the above configuration, the processing circuitry is configured to calculate the congestion risk for each of the potential evasion routes. Further, the processing circuitry is configured to set the evasion route based on the maximum of the collision risk and the congestion risk.

Further, the obstacle information may include one of information detected by a radar, a lidar, a sonar, and image sensors mounted on the movable body, information received by an automatic identification system receiver, information transmitted by the other vessels other than the movable body, and information detected by a wireless communication at a location other than the movable body. The obstacle information may further include information related to other objects, including at least one of the other vessels, currents, weather, reefs, or stranded vessels.

The navigation planning system of the present invention includes a display for displaying the evasion route together with the planned route on a display image. The navigation planning system further includes a route planning unit for providing one or more routes for the navigation of the movable body from the starting point to a destination point, and a sensor unit for obtaining fault information.

In the navigation planning system of the present invention, the processing circuitry is configured to acquire one of the evasion route information generated outside the movable body via the wireless communication such as a satellite communication, and information related to the evasion route set in the evasion route setting module. The processing circuitry is further configured to generate the potential evasion route from the plurality of the evasion routes of a route different from the planned route between the evasion starting point and the return point on the planned route, and an evasion route selection part for selecting the evasion route from the plurality of potential evasion routes.

The navigation planning system may be provided with a display for displaying a chart navigated by the movable body and a user interface for receiving a route set by a user from the chart displayed on the display, so as to obtain the information of the evasion route set.

In one embodiment, a navigation planning method of the present invention is a method for planning a route from a departure place to the destination point. The method comprises acquiring a planned route for a movable body on a water. Further, the method comprises acquiring movable body information including a position, a moving direction, and a speed of the movable body. Further, the method comprises acquiring obstacle information including a position, a moving direction, and a speed of an obstacle located in a surrounding area of the movable body. Furthermore, the method comprises acquiring an evasion route comprising the starting point is located on the planned route, different from the planned route. Subsequently, the method comprises calculating a collision risk indicating a risk level of collision between the movable body and the obstacle based on the movable body information and obstacle information.

The navigation planning method further comprises obtaining a maximum evasion route collision risk when the movable body travels on the evasion route and a maximum planned route collision risk when the movable body travels on the planned route, calculated by the collision risk calculator respectively. Further, the method comprises comparing the maximum evasion route collision risk with the maximum planned route collision risk. Furthermore, the method outputs a navigation route change signal indicating that the movable body change the planned route to the evasion route when the maximum evasion route collision risk is less than the maximum planned route collision risk.

The navigation planning method further comprises generating a plurality of potential evasion routes different from the planned route between an evasion starting point and a return point on an unnavigated route. The method comprises selecting the evasion route among the plurality of potential evasion routes. The method further comprises calculating the maximum collision risk when the movable body travel along the evasion route from the evasion starting point to the return point, and selecting the potential evasion route, as the evasion route, whose maximum collision risk is the minimum among the plurality of potential evasion routes.

The navigation planning method further includes calculating a congestion risk indicating a degree of approaching a plurality of obstacles simultaneously based on each of the collision risk between the movable body and the obstacle. Further, the method includes obtaining a maximum evasion route congestion risk when the movable body travels on the evasion route and a maximum planned route congestion risk when the movable body travels on the planned route, calculated by the congestion risk calculator respectively. The method further includes comparing the maximum evasion route congestion risk with the maximum planned route congestion risk. Further, the method includes outputting the navigation route change signal when the maximum evasion route collision risk is less than the maximum planned route collision risk, and when the maximum evasion route congestion risk is less than the maximum planned route congestion risk.

In the method, the evasion starting point may be one of a current navigational position of the movable body moving on or along the planned route, any position on the unnavigated route on the planned route, and a future position of the movable body calculated from the current navigational position of the movable body moving along the planned route.

The navigation planning method of the present invention comprises calculating a planned route distance when the movable body travels on the planned route starting at the evasion starting point for a predetermined time, and an evasion route distance when the movable body travels on the evasion route starting at the evasion starting point for a predetermined time, respectively. The method further comprises determines whether to output the navigation route change signal based on the planned route distance and the evasion route distance.

The navigation planning method of the present invention comprises outputting the navigation route change signal when the maximum collision risk is less than or equal to a predetermined base the second large range. Further, the method comprises determining whether to output the navigation route change signal based on the planned route distance and the evasion route distance when the maximum collision risk is not less than the base of the second large range.

The navigation planning method of the present invention further comprises calculating the congestion risk indicating the degree of simultaneous approach of the obstacle included in the congestion risk the obstacle based on the collision risk corresponding to each of the obstacles from a plurality of the obstacles. The method comprises calculating the planned route congestion risk starting at the evasion starting point on the planned route, the evasion route congestion risk starting at the evasion starting point on the evasion route. The method comprises comparing the planned route congestion risk with the evasion route congestion risk, when the maximum evasion route collision risk is less than the maximum planned route collision risk and the evasion route congestion risk is less than the planned route congestion risk, and the navigation route change to the evasion route may be indicated.

The navigation planning method of the present invention comprises setting the return point to which the movable body returns on the planned route. The method further comprises calculating the planned route distance between the evasion starting point and the return point, and the evasion route distance between the evasion starting point and the return point. Further, the method comprises determining whether to output the navigation route change signal based on the planned route distance and the evasion route distance.

The computer program is an executable program that, when executed by a computer, causes a computer to acquire planned route information indicating a planned route of a movable body moving over water, causes the computer to acquire movable body information including a position and a direction of movement of the movable body, causes the computer to acquire obstacle information including a position and a direction of movement for each of a plurality of the obstacles in a vicinity of the movable body, causes the computer to acquire information concerning the evasion route different from the planned route starting at an evasion starting point at which the movable body starts the evacuation, and causes the computer to acquire information concerning a collision risk indicating a degree of risk of collision between the movable body and each of the obstacles from the plurality of obstacles based on the movable body information and the obstacle information. Further, a maximum of the collision risk when the movable body sails on the planned route starting at the evasion starting point and a maximum of the collision risk when the movable body sails on the evasion route starting at the evasion starting point are calculated respectively, the maximum collision risk of the planned route is compared with the maximum collision risk of the evasion route. When the maximum collision risk of the evasion route is less than the maximum collision risk of the planned route, a navigation route change signal indicating navigation route change to the evasion route is outputted.

In the navigation planning system of the present invention, when a plurality of the obstacles are detected on the planned route, the collision risk is contrasted between the evasion route set ahead of the current position or the predicted position of the movable body and the planned route, and the choice of the adoption or rejection of the evasion operation may be made based on the result, so that the movable body such as the vessel may be safely navigated.

BRIEF DESCRIPTION OF DRAWINGS

Embodiments illustrated for means to solve the problem will be better understood by reference to the drawings. Here, similar portions are designated by similar numerals throughout. The following description is intended only as an embodiment and simply illustrates certain selected embodiments of systems, devices, and methods consistent with the challenges claimed herein and the means for solving them.

FIG. 16 is a block diagram showing the configuration of yet another embodiment of the navigation planning system of the present invention, which further includes a congestion risk calculator and a congestion risk comparator with respect to the configuration shown in FIG. 1;

FIG. 21 is a flowchart showing a process in an embodiment of the navigation planning method of the present invention.

Figure 1:
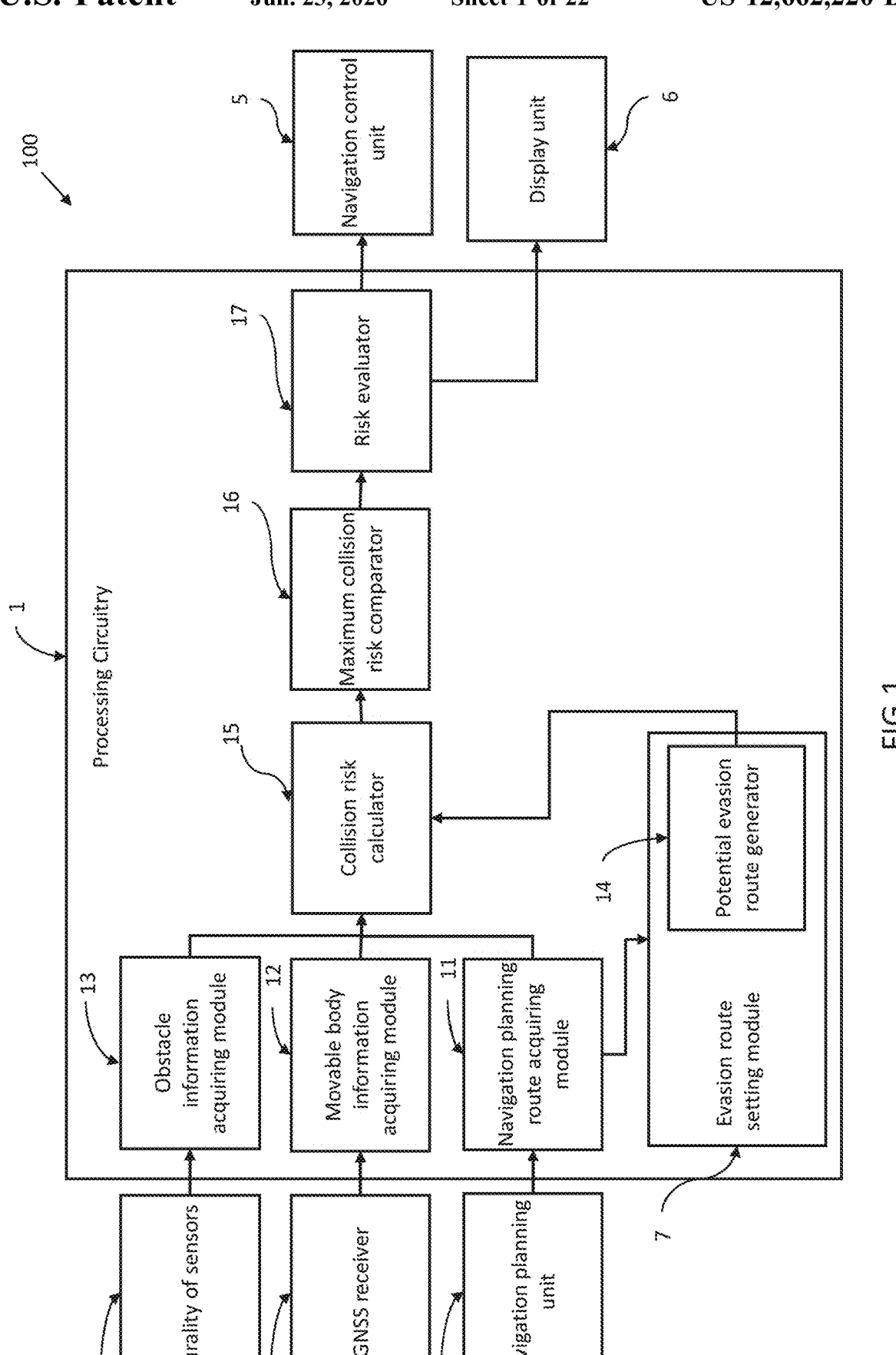
FIG. 1 is a block diagram illustrating a configuration of an embodiment of a navigation planning system of the present invention.

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION OF THE EMBODIMENTS

Embodiments of the navigation planning system of the present invention will now be described with examples. Other exemplary embodiments or features may further be utilized, and other modifications may be made without departing from the spirit or scope of the subject matter presented herein.

The exemplary embodiments described herein are not limited. It will be readily appreciated that the embodiments of the present invention described herein generally and illustrated in the drawings may be arranged, substituted, combined, separated, and designed in a wide variety of different configurations as expressly contemplated herein.

In the following detailed description, reference is made to the accompanying drawings which form part thereof.

Figure 2:
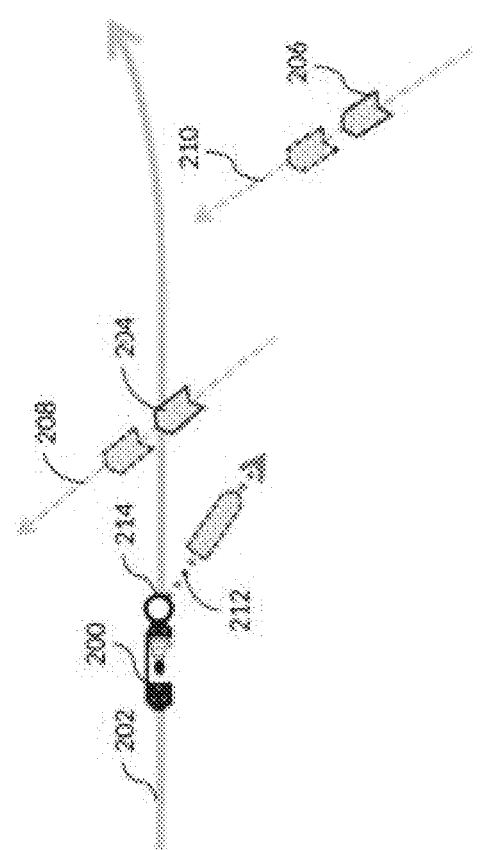
FIG. 2 is a diagram illustrating a positional relationship between a vessel travelling on a planned route and other vessels approaching the vessel in an embodiment of the navigation planning system of the present invention.

FIG. 1 is a block diagram illustrating a configuration of a navigation planning system 100 for safely navigating a movable body 200 in accordance with an embodiment of the present invention. FIG. 2 is a diagram illustrating a positional relationship between a vessel navigating on a planned route in an embodiment of the navigation planning system of the present invention and other vessels approaching the vessel.

Hereinafter, the movable body 200 may be referred to as a vessel 200 (i.e., own vessel 200) as appropriate. The navigation planning system 100 may be equipped on the vessel 200 to navigate the vessel 200 from a starting point to a destination point. Once the voyage is initiated, the navigation planning system 100 may monitor a proper navigation of the vessel 200 along a planned route 202, that is a route to be followed by the vessel 200 between the starting point and the destination point.

The navigation planning system 100 may comprise a processing circuitry 1 that includes an obstacle information acquiring module 13, a movable body information acquiring module 12, a navigation planning route acquiring module 11, an evasion route setting module 7, a potential evasion route generator 14, a collision risk calculator 15, a maximum collision risk comparator 16, and a risk evaluator 17.

In one embodiment, the navigation planning system 100 is used for the purpose of ensuring that the vessel 200 may safely navigate, and avoid collisions with the other vessels identified as an obstacle, adverse sea conditions, weather, and other surrounding obstacles. A vessel operator, operating the vessel 200, navigates along the planned route 202 with an assistance of the navigation planning system 100 and a navigation control unit 5 operating the vessel with reference to a display unit 6. The navigation control unit 5 and the display unit 6 are appropriately equipped on the vessel or incorporated into the navigation planning system 1.

The navigation control unit 5 is operatively connected to the risk evaluator 17. The navigation control unit 5 is configured to monitor and control the navigation of the vessel 200 based on a determination as to whether the vessel 200 may deviate from the planned route 202 or continue navigation along the planned route 202 or an evasion route 212. Further, the evasion route 212 is configured to evade the obstacle for further evasion.

As shown in FIG. 2, in this embodiment, the planned route 202 is the route that the vessel 200 may follow in order to navigate and safely reach the destination point. The planned route 202 indicates a course direction of the vessel 200 from a current location of the vessel 200.

In FIG. 1, a navigation planning unit 2 is configured to store multiple routes for the navigation of the vessel 200. In this embodiment, the vessel operator may operate a variety of peripherals operably connected to the navigation planning system 100 to perform a variety of functions according to the functions of the navigation planning system 1. For example, a user may provide various instructions to the navigation planning system 1 about the starting point location and the destination point of the navigation of the vessel 200 by operating a peripheral device such as a keyboard or mouse.

The navigation planning unit 2 may provide one or more routes for the navigation of the ow vessel 200 from the starting point to the destination point based on information such as a source location associated with the starting point and a destination location associated with the destination location obtained from the user. In this embodiment, each route from the one or more routes may include a date and time of the navigation, weather conditions, tidal conditions, and the like, and may be associated with this information.

The navigation planning unit 2 receives a user input from the vessel operator or an associated person for the selection of the route as the planned route 202 for the navigation of the vessel 200 from a starting point location (i.e., the source location) to the destination location. In this embodiment, the vessel operator selects the route to travel, but as an alternative embodiment, the navigation planning unit 2 may select an optimal route based on current weather conditions, travel time, tidal or tidal current conditions, and the like.

The navigation planning system 100 utilizes information related to the movable 200 body, such as the other vessels, and a plurality of obstacles 204, 206 in an area surrounding the vessel 200 to safely navigate the vessel 200 from its origin to the destination point along the planned route 202.

Further, a Global Navigation Satellite System (GNSS) receiver 3, typically mounted on the vessel 200, obtains the movable body information. The movable body information comprises a position, a direction of movement i.e., a movement direction, and a speed of the vessel 200. The GNSS receiver 3 receives a satellite signal and accurately obtains the movable body information for the vessel 200. The movable body information may further include information about a velocity of the movable body 200. Further, obstacle information may include information about a velocity of the obstacle. The movable body information may be calculated from changes in the position and the movement direction of the movable body 200.

Further, a plurality of sensors 4 obtains the obstacle information. The obstacle information includes a position, a movement direction, and a speed of a plurality of the obstacles 204 and 206 that may interfere with the navigation of the vessel 200. The plurality of sensors 4 may correspond to one or more navigation electronics. In one embodiment, specific configuration of the plurality of sensors 4 is a device having a detection or sensing function such as a radio detection and ranging (RADAR) device, a light detection and ranging (LIDAR) device, an acoustic navigation and ranging (SONAR) device, an automatic identification system (AIS) receiver, and an image sensor such as a camera or video recorder mounted on the vessel 200. The plurality of sensors 4 may be able to detect the obstacle in the navigation of the vessel 200, not limited to the above, and may also be provided with information transmitted from the other vessels or a land management station, not limited to the plurality of sensors mounted on the vessel 200.

In this embodiment, the obstacle information includes information detected by any or at least one of radar, LIDAR device, SONAR device, and an image sensor, information acquired by an AIS receiver, information transmitted from another vessel, and information acquired by detecting radio communication at a location other than the vessel 200.

In this embodiment, for ease of understanding, there are two obstacles 204 and 206 around the vessel 200 as shown in FIG. 2, but the number of the obstacles is not limited to only two and may be more than two. In various other embodiments, the plurality of the obstacles that are planning to cross or approach the planned route 202, or are threatened, may include any number of the obstacles greater than or equal to two.

In this embodiment, the obstacle information further includes information related to other movable bodies, including at least one of the other vessels, currents, weather, reefs, and stranded vessels. The information related to the other movable bodies may be obtained in a manner like obtaining information for the plurality of the obstacles 204, 206.

Referring again to FIG. 1, the navigation planning system 100 includes a navigation planning route acquiring module 11 for obtaining information about the planned route of the vessel 200 from the navigation planning unit 2, a movable body information acquiring module 12 for obtaining location information, and the like. of the vessel 200 obtained by the GNSS receiver 3, an obstacle information acquiring module 13 for obtaining the obstacle information detected by the plurality of sensors 4 and an evasion route setting module 7. The evasion route setting module 7 sets the evasion route of the vessel 200 based on the information.

The navigation planning route acquiring module 11 receives the planned route selected by the vessel operator as the planned route 202, and is operatively connected to the navigation planning unit 2. The movable body information acquiring module 12 is operatively connected to and may communicate with the GNSS receiver 3 to receive the movable body information associated with the vessel 200. In addition, the movable body information acquiring module 12 is configured to store the movable body information.

In this embodiment, the movable body information acquiring module 12 periodically acquires the movable body information of the vessel 200, and the obstacle information acquiring module 13 periodically acquires the obstacle information of the plurality of the obstacles 204 and 206.

The obstacle information acquiring module 13 is operatively connected to and may communicate with the plurality of sensors 4 to receive the obstacle information related to the plurality of the obstacles 204 and 206. The obstacle information acquiring module 13 is configured to receive the obstacle information including the position, the movement direction, and the speed of each of the obstacles 204 and 206 traversing or approaching the planned route traversed by the vessel 200 as detected by the plurality of sensors 4. In this embodiment, the planned route is the planned route 202 that the vessel 200 plans to navigate. The obstacle information acquiring module 13 is further configured to store the obstacle information.

The evasion route setting module 7 may acquire evasion route information generated outside the movable body 200 via wireless communication such as satellite communication or may acquire the evasion route information about the evasion route set in the evasion route setting module 7. The evasion route setting module 7 includes a potential evasion route generator 14 for generating a potential evasion route from a plurality of potential evasion routes having routes different from the planned route between an evasion starting point and a return point on the planned route. The risk evaluator 17 includes an evasion route selector (not shown in the figures) for selecting the evasion route from the plurality of potential evasion routes.

The evasion route selector may be configured to select which the evasion route is the appropriate route when the determination is made to switch from the planned route to the evasion route, and the selection method may be described later. Although the evasion route selector is not shown in the figures, but it is provided in the risk evaluator 17 and functions to select the evasion route in consideration of a collision risk a distance of the evasion route and the like to be described later.

The evasion route setting module 7 may be provided with a display for displaying a chart navigated by the movable body 200, and a user interface for receiving the route set by the user from the chart displayed on the display. The evasion route setting module 7 may further acquire information of the evasion route set.

Further, the situation around the vessel 200 may be detected at a predetermined period, and the evasion route may be set at any time at the predetermined period. In one embodiment, the evasion route may be set when the obstacle is detected, and the collision risk of the obstacle is determined to be high.

Further, the situation around the vessel 200 is detected at the predetermined period, and the evasion route setting module 7 sets the evasion route at the predetermined period. The evasion route setting module 7 includes the potential evasion route 14 generator which automatically generates the plurality of potential evasion route. The evasion route selector that selects the evasion route from the plurality of potential evasion route by performing a predetermined condition, for example, the collision risk evaluation result.

In addition to the above configuration, the navigation planning system 100 of the present invention further includes the collision risk calculator 15, the maximum collision risk comparator 16, and the risk evaluator 17. The collision risk calculator 15 is operatively connected to and may communicate with the navigation planning route acquiring module 11, the movable body information acquiring module 12, and the obstacle information acquiring module 13.

The collision risk calculator 15 receives the planned route 202 as the route to be navigated, the movable body information of the vessel 200, and the obstacle information of the plurality of obstacles 204 and 206. The collision risk calculator 15 further calculates a risk that quantifies the collision risk with the vessel 200. The calculation of the collision risk may be described in detail later with reference to FIGS. 3 to 7.

Figure 8:
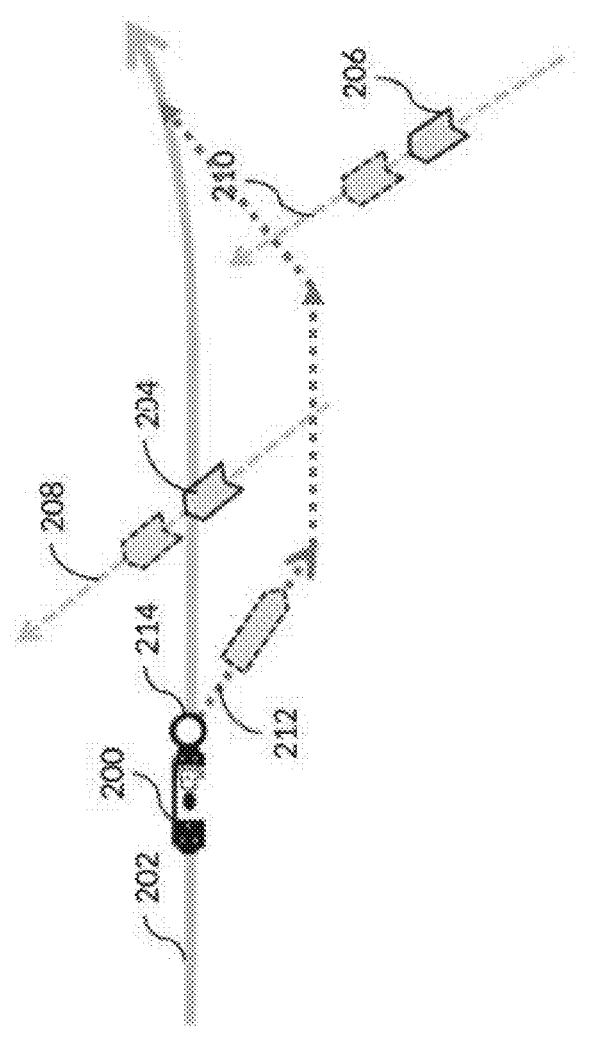
FIG. 8 is a diagram showing an example of the relationship between the vessel and the other vessels of the navigation planning system of the present invention.

FIG. 8 shows that the vessel 200 is traveling on the planned route 202, and the other vessels 204 and 206, which are the obstacles, are traveling along and approaching a predicted unnavigated (future) routes 208 and 210, respectively. When the vessel 200 continues to travel along the planned route, it shows a possibility of interference or collision of the vessel 200 and the other vessels 204 and 206 on the predicted future routes 208 and 210 which are crossing the planned route 202.

Figure 9:
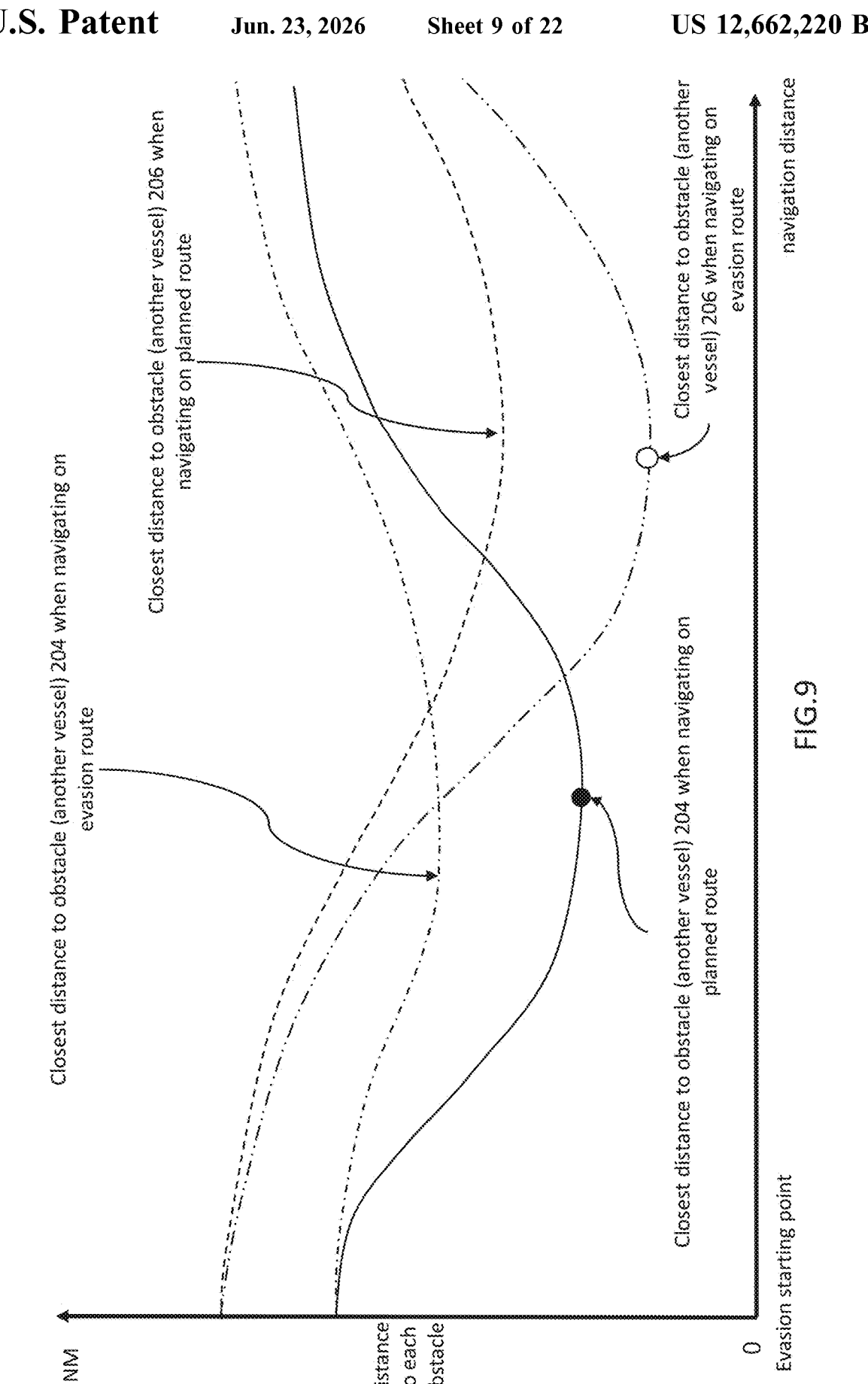
FIG. 9 is a diagram showing a change in a distance between the vessel and the other vessels when the vessel navigates the planned route and a change in the distance between the vessel and the other vessels when the vessel navigates an evasion route in an embodiment of the navigation planning system of the present invention.

FIG. 9 shows the change in distance for the other vessel 204 (i.e., solid line) and the other vessel 206 (i.e., dashed line) when the vessel 200 travels for a predetermined time from the evasion starting point at which it begins its evacuation on the planned route. Further, FIG. 9 shows the change in distance for the other vessel 204 (i.e., dash-dot line) and the other vessel 206 (i.e., dash-dot line) when the vessel 200 travels for the predetermined time on the evasion route outside the planned route at the evasion starting point.

In one embodiment, when the vessel 200 deviates from the planned route, the other vessel 204 approach the vessel 200 under the circumstances shown in FIG. 8, and the distance between the two vessels approaches. At the position indicated by the black circle in FIG. 9, the two vessels approach the closest, and then the distance increases because the two vessels move away from each other. Subsequently, the other vessel 206 approach the vessel 200, and the distance is larger than that of the other vessel 204 even when they approach the closest. That is, the collision risk with the own ship is small. Therefore, the maximum collision risk on the planned route is calculated based on the state where the other vessel 204 and 206 are closest to each other.

On the other hand, when the vessel 200 evades on the evasion route, under the situation shown in FIG. 8, the other vessel 204 approaches the vessel 200, and the distance between the two, showing a change as shown by the dashed line in FIG. 9. The distance is larger than the distance when the vessel 200 travels on the planned route. However, when the other vessel 206 approaches, the nearest approach distance is closer to the distance indicated by the white circle and is smaller than the nearest approach distance to the other vessel 204 when the vessel 200 travels on the planned route. That is, the collision risk is high. Therefore, the maximum collision risk of the evasion route is calculated based on the state where the other vessel 206 and 204 are closest to each other. This value is larger than the maximum risk value of the planned route.

Referring again to FIG. 1, the collision risk calculator 15 calculates a collision risk expected to be on the planned route 202 based on the movable body information of the vessel 200 and the obstacle information for the other vessels 204 and 206, respectively.

The collision risk calculator 15 is configured to calculate the collision risk associated with the obstacle (i.e., the other vessels 204 and 206) when traveling on the planned route based on the movable body information and the obstacle information, assuming that the point of the vessel 200 or the position on the planned route or where the vessel 200 is currently located is the evasion starting point. Similarly, the collision risk in the case of traveling on the evasion route for the predetermined time is calculated starting from the evasion starting point.

The navigation planning system 100 of the present invention further includes the maximum collision risk comparator 16, and the collision risk is input from the collision risk calculator 15 to the maximum collision risk comparator 16. The maximum collision risk comparator 16 calculates the maximum value of each of the collision risk of the planned route and the evasion route, and compares them.

The maximum collision risk comparator 16 calculates a planned route maximum risk value and an evasion route maximum risk value, and compares the values of both. In the example of this embodiment shown here, since the maximum collision risk for the other vessels 206 on the evasion route of the vessel 200 is higher than the other vessels 204 on the planned route, as described above, the comparison result is output to the risk evaluator 17.

In the above description with reference to FIG. 9, the evasion is started from the position where the vessel 200 is actually present on the planned route, and this is designated as the evasion starting point, but the evasion starting point is not limited to this, and the actual position on the planned route is affected by sea conditions, and there may be a discrepancy, but this may be the case.

The vessel 200 may be any point on the unnavigated route of the planned route rather than the current location, or it may be a predicted location calculated based on the movable body information of the vessel 200 based on the actual location described above.

Figure 10:
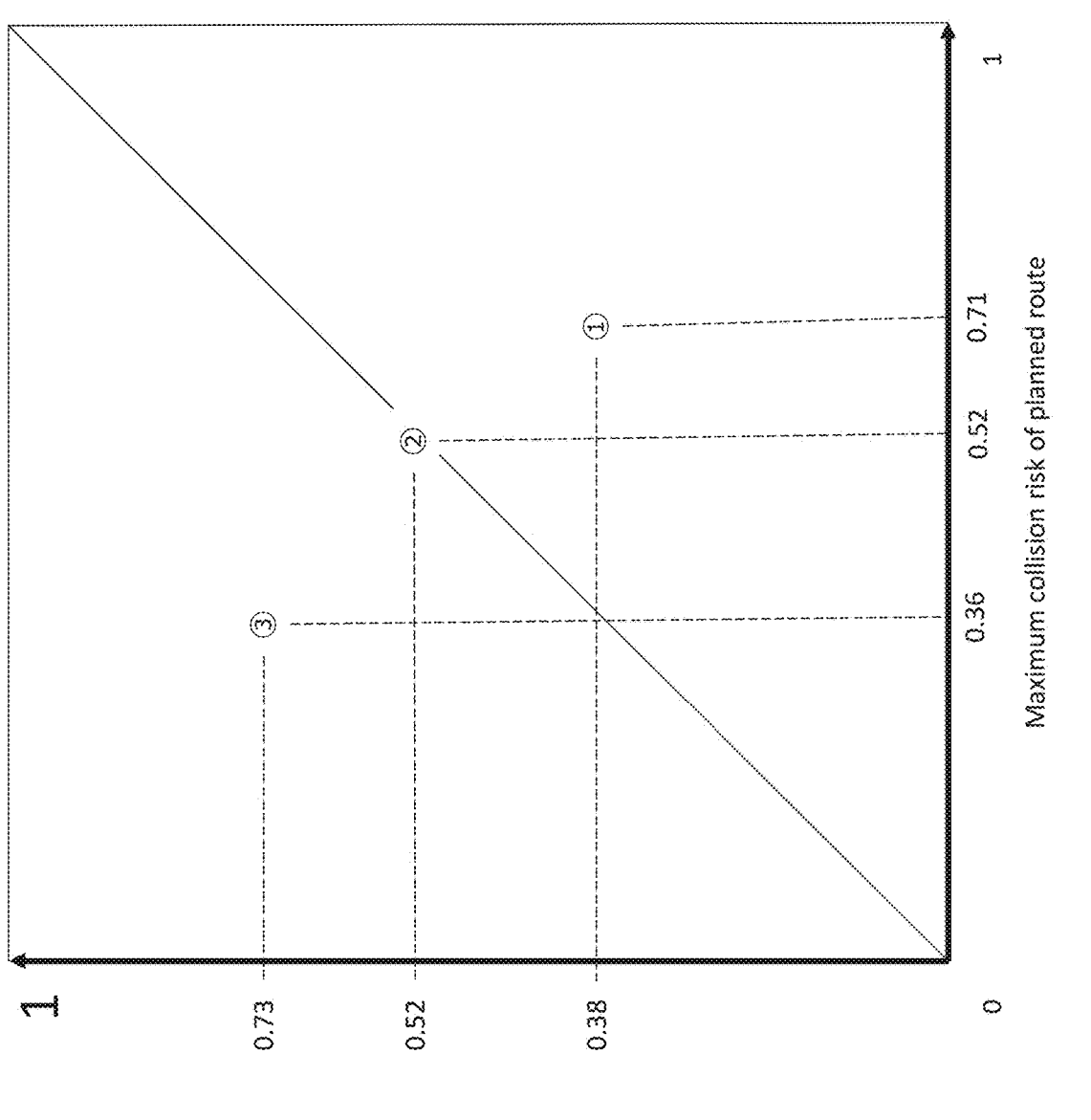
FIG. 10 is a diagram showing the relationship between a maximum collision risk when the vessel navigates the planned route and a maximum collision risk when the vessel navigates the evasion route in an embodiment of the navigation planning system of the present invention.

FIG. 10 is a diagram showing the relationship between the maximum collision risk when the vessel navigates the planned route and the maximum collision risk when the vessel navigates the evasion route in an embodiment of the navigation planning system of the present invention.

Three cases are shown here. That is, in case 1, the planned route maximum risk value is 0.71, that of the evasion route is 0.38, and that of the evasion route is smaller. In case 2, both are 0.52, and in case 3, they are 0.36 and 0.73.

In case 1, the planned route maximum collision risk is significantly reduced by that of the evasion route maximum collision risk, indicating that the collision risk is reduced by navigating the evasion route rather than by navigating the planned route. In case 2, both values are the same, indicating that the collision risk does not change whether the planned route is navigated or switched to the evasion route. In case 3, the evasion route maximum collision risk is rather large, indicating that the collision risk may be reduced by navigating the planned route as it is.

As described above, the navigation planning system 100 of the present invention may examine whether the collision risk is reduced by the evasion route set for the purpose of avoiding the obstacle.

Figure 3:
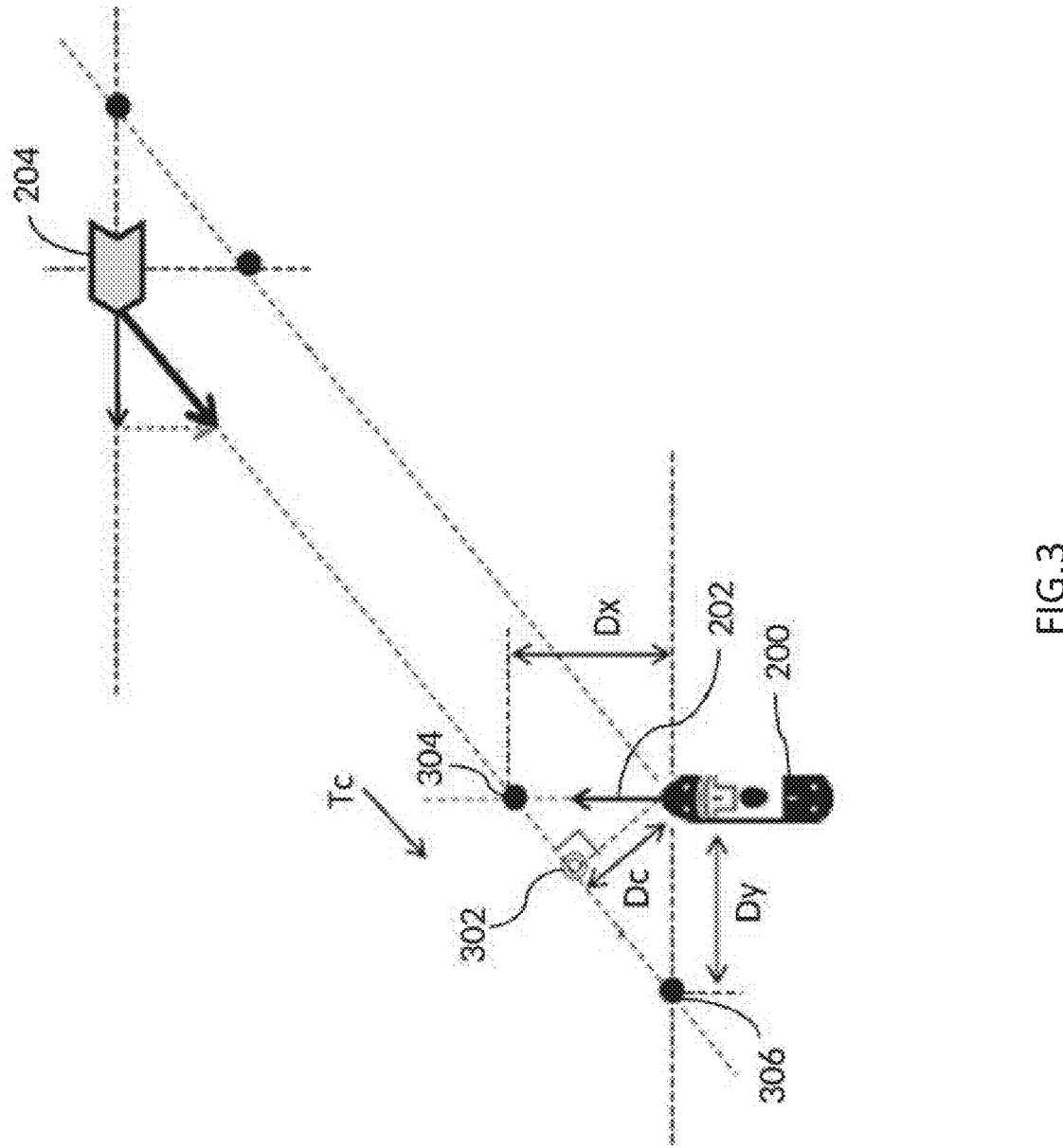
FIG. 3 is a diagram illustrating the positional relationship between a movable body (i.e., the vessel) and an obstacle (i.e., the other vessels) for calculating a collision risk in an embodiment of the navigation planning system of the present invention.

Further, calculation of the collision risk with the obstacle of the vessel 200 will be described with reference to the respective figures of FIGS. 3 to 7. FIG. 3 shows the determination of a collision risk associated with the obstacle 204 along the planned route according to an embodiment of the navigation planning system of the present invention.

The collision risk calculator 15 calculates the collision risk for the obstacle 204 based on the movable body information and the obstacle information. In one embodiment, the collision risk of the obstacle 204 is determined based on the position, the movement direction, and speed of the vessel 200, and the position, the movement direction, and speed of the obstacle 204.

The collision risk calculator 15 is configured to determine a closest proximity distance Dc and/or a closest proximity distance Dx or Dy in a specific direction between the vessel 200 and the obstacle 204 based on the movable body information and the obstacle information. In this embodiment, the closest proximity distance Dc is the distance between the current position of the vessel 200 and the closest proximity point 302. In the figure, the closest proximity distance Dx in a vertical direction (For example, the direction of navigation as seen from the vessel 200) is the distance between the current position of the vessel 200 and the closest proximity point 304 in the vertical direction.

The closest proximity distance Dy in the vertical direction (In this case, the direction of navigation of the vessel is horizontal.) is the distance between the current position of the vessel 200 and the closest proximity point 306 in the horizontal direction. The collision risk calculator 15 calculates the closest proximity distance Dc, Dx, and Dy when the vessel 200 and the obstacle 204 approach from the positional relationship between the vessel 200 and the obstacle 204, the relative velocity between the vessel 200 and the obstacle 204, and the movement direction and velocity between the vessel 200 and the obstacle 204.

The collision risk calculator 15 calculates the collision risk of the obstacle 204 based on at least one of the closest proximity distance Dc between the vessel 200 and the obstacle 204 and the closest proximity distance Dx or Dy in a specific direction.

In this embodiment, when the closest proximity distance Dc is less than or equal to a predetermined distance and the risk evaluator 17 determines that the collision risk is high, the vessel 200 needs to avoid the obstacle 204. In this case, the vessel 200 leaves the planned route 202 and travels along a different route, namely the evasion route 212 to be configured. On the other hand, if the closest approach distance Dc is greater than the predetermined distance, the risk evaluator determines that the collision risk is low, and the vessel 200 may continue to travel along the planned route 202.

In this embodiment, the collision risk may be calculated by specifying the positional relationship between the vessel 200 and the obstacle 204 based on either the closest approach distance Dx in the vertical direction or the closest approach distance Dy in the horizontal direction. Generally, the risk of collision between the vessel 200 and the obstacle 204 increases when the obstacle 204 crosses the front of the vessel 200.

In this embodiment, the collision risk calculator 15 is further configured to determine the time Tc required for the other vessels to reach the closest approach distance 302. Based on the closest approach distance Dc and the time Tc required for the other vessels to reach the closest approach distance 302, the collision risk calculator 15 determines the collision risk of the obstacle 204 when the vessel 200 is traveling from the origin (For example, the starting point) of the planned route 202 toward the destination point. The time Tc required for the other vessels to reach the closest approach distance 302 is calculated based on the movable body information and the obstacle information.

When the collision risk is calculated based on the closest distance Dc between the vessel 200 and the obstacle 204, the collision risk increases even if the time until the vessel 200 approaches the obstacle 204 is very long. As a result, the vessel 200 may have to deviate from the planned route to avoid collision with the obstacle 204 after a time.

Therefore, in this embodiment, the collision risk associated with the obstacle 204 is determined by taking into account the closest distance Dc between the own vessel 200 and the obstacle 204 and the time Tc required for the other vessels to reach the closest point 302.

As an example, the collision risk for the obstacle 204 is calculated and determined based on the following equation (1).

$$\text{collision risk} = \max(Dx, Dy) * RTc \qquad (1)$$

Figure 4:
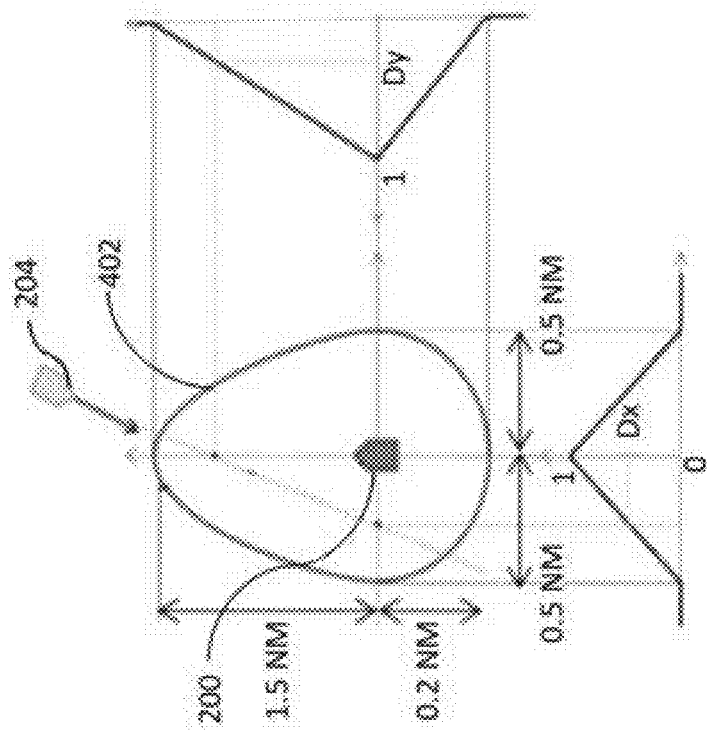
FIG. 4 is a diagram illustrating the collision risk corresponding to the positional relationship between the vessel and the other vessels in an embodiment of the navigation planning system of the present invention.

FIG. 4 further illustrates the relationship between the collision risk and the vertical distance between the vessel 200 and the obstacle 204, and the relationship between the collision risk and the horizontal distance between the vessel 200 and the obstacle 204. As an example, the collision risk between the closest neighbor distances Dx and Dy in the vertical and horizontal directions is shown.

Figure 5:
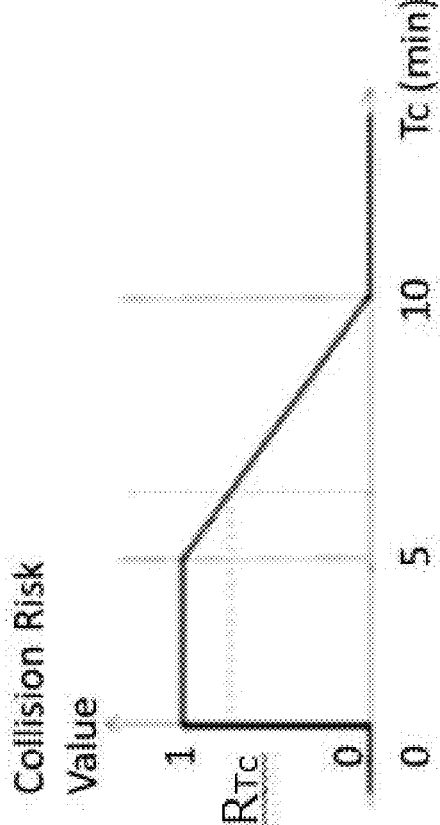
FIG. 5 is a diagram illustrating a relationship between the collision risk and a time until the vessel and the other vessels are located at a closest distance in an embodiment of the navigation planning system of the present invention.

FIG. 5 shows the relationship between the collision risk and the time Tc required for the other vessel, that is the obstacle for the vessel 200, to reach the closest neighbor 302. When the time Tc is small, the collision risk increases. In the example shown here, when the time Tc is less than or equal to a predetermined time, the collision risk is high, and in this state, the maximum value 1 is determined.

Figure 6:
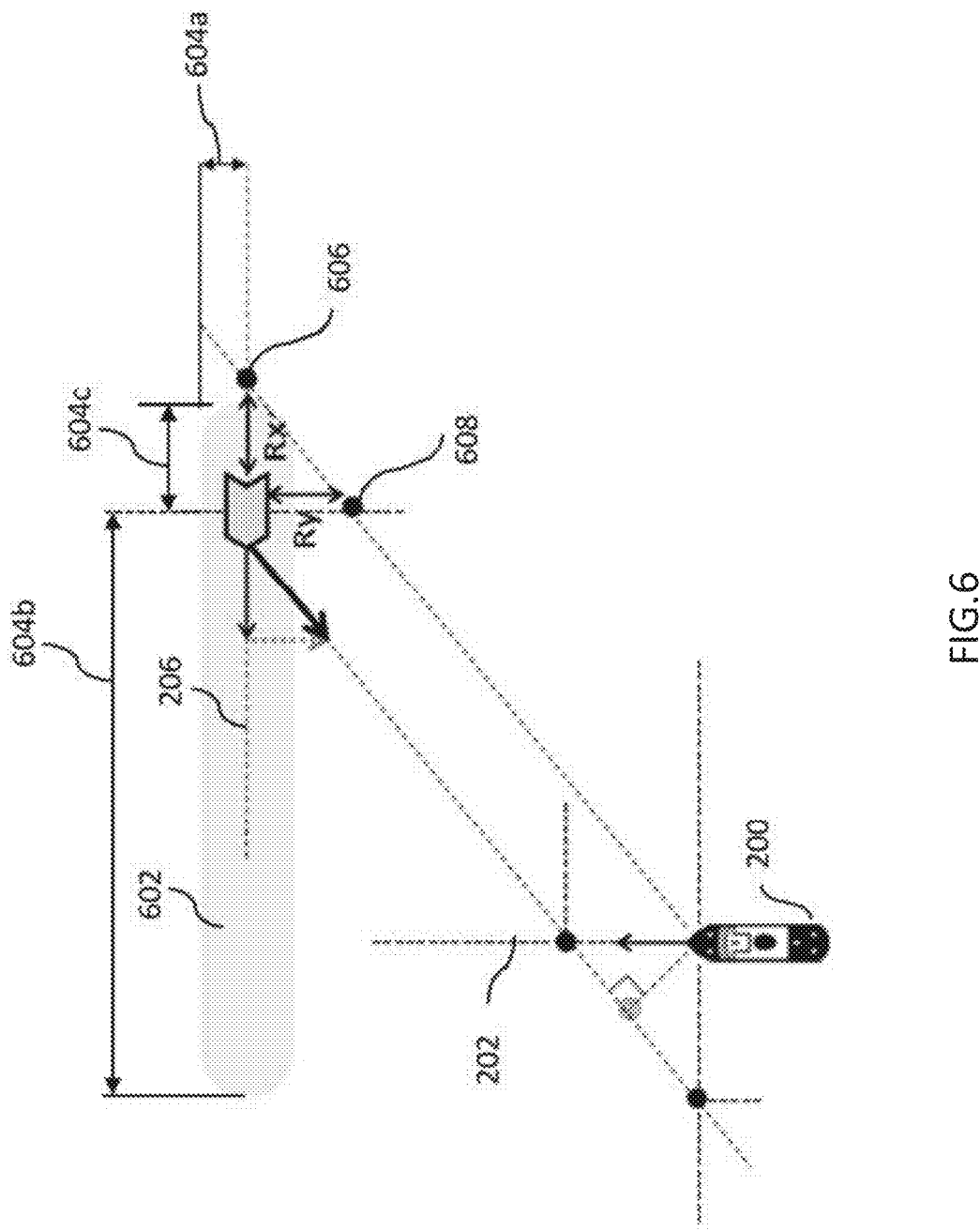
FIG. 6 is a diagram illustrating the positional relationship between the vessel and the other vessels for calculating the collision risk in an embodiment of the navigation planning system of the present invention, and a diagram illustrating a bumper area set around the other vessels.

FIG. 6 illustrates determining the collision risk when the vessel 200 approaches the obstacle 204, according to another embodiment of the navigation planning system of the present invention. In one embodiment, an obstacle bumper area 602 of the obstacle 204 is determined based on the position, the movement direction, and the speed of the obstacle 204, or vessel. The obstacle bumper area 602 of the obstacle 204 is located on the projected future route 206 of the obstacle 204 based on the movement direction of the obstacle 204.

The obstacle bumper area 602 of the obstacle 204 includes an area around the obstacle 204. The obstacle bumper area 602 of the obstacle 204 may be determined based on the safe passage distances 604*a*, 604*b*, and 604*c*, which are the closest distances allowed on the side, front, and back of the vessel 200, respectively, to prevent collisions.

Figure 7:
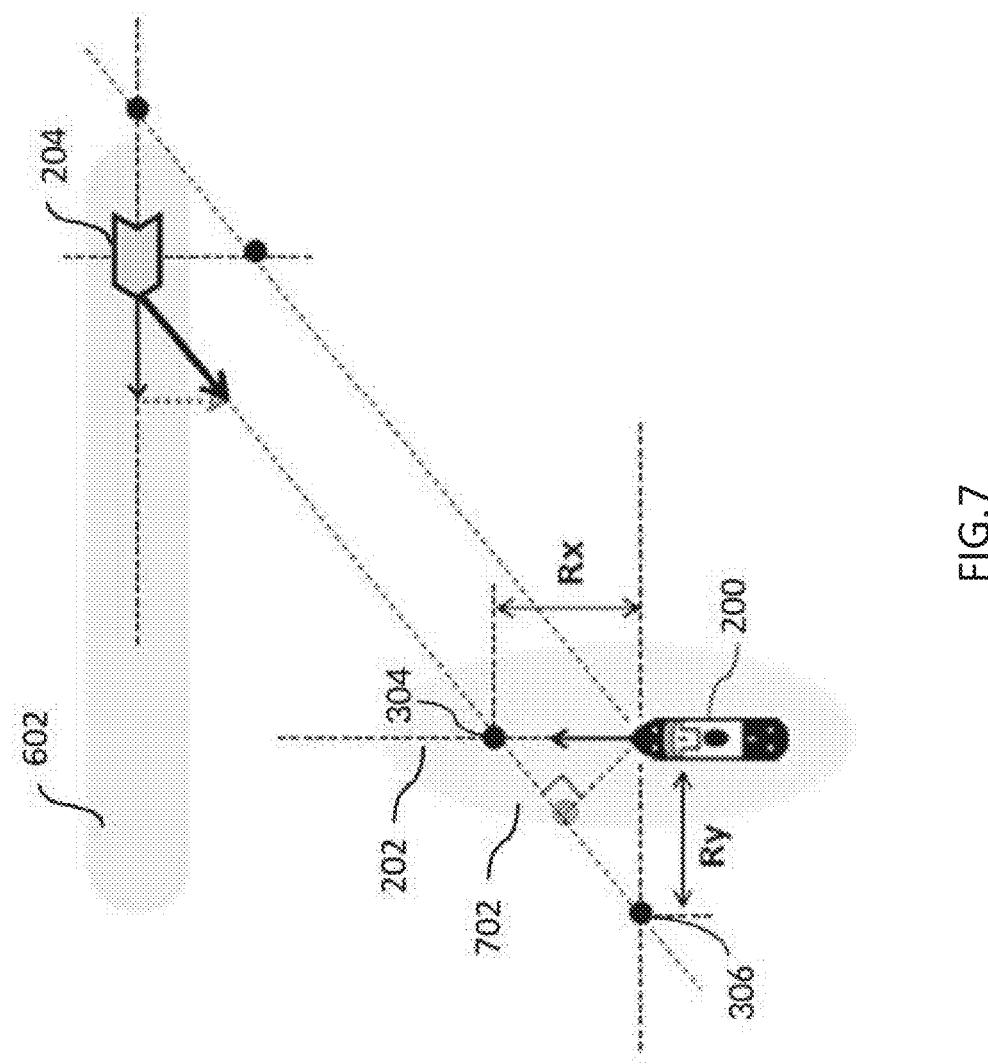
FIG. 7 is a diagram showing that the bumper area (area) is also set around the vessel in the diagram shown in FIG. 6.

The obstacle bumper area 602 corresponds to a restricted area and may simultaneously recognize the direction of the potential collision and the distance between the vessel 200 and the obstacle 204. The closest approach point (relative to the obstacle 204) between the vessel 200 and the obstacle 204 in a vertical or horizontal direction 606 or 608 is determined based on the movable body information and the obstacle information. There is no risk of collision when the closest approach point 606 or 608 between the vessel 200 and the obstacle 204 in a vertical or horizontal direction is outside the obstacle bumper area 602. As shown in FIG. 7, in this embodiment, there is no risk of collision because neither the closest approach point 606 in a vertical direction at a distance of Rx from the obstacle 204 nor the closest approach point 608 in a horizontal direction at a distance of Ry exists in the obstacle bumper area 602.

In this embodiment, the collision risk calculator 15 calculates a time required for the vessel 200 to penetrate the obstacle bumper area 602 based on the relative speed between the vessel 200 and the obstacle 204. The collision risk calculator 15 further calculates the collision risk of the obstacle 204 based on the time required for the vessel 200 to penetrate the obstacle bumper area 602.

FIG. 7 illustrates the determination of the collision risk when the vessel 200 approaches the obstacle 204 according to yet another embodiment of the navigation planning system of the present invention. In one embodiment, a movable body bumper area 702 of the vessel 200 is determined based on the location, the movement direction, and the speed of the vessel 200. The movable body bumper area 702 of the vessel 200 is located on the intended route (i.e., the planned route 202 of this embodiment) of the vessel 200 based on the direction of movement of the vessel 200 and includes the vessel 200 and the surrounding area.

The closest approach point 304 in the vertical direction or the closest approach point 306 in the horizontal direction between the vessel 200 and the obstacle 204 is calculated based on the movable body information and the obstacle information. When the closest approach point 304 in the vertical direction and closest approach point 306 in the horizontal direction between the vessel 200 and the obstacle 204 are outside the movable body bumper area, then there is no risk of collision in area 702.

As shown in FIG. 7, in the present embodiment, the closest approach point in the vertical direction 304 at a distance Rx from the vessel 200 is located in the movable body bumper area 702, and therefore there is a risk of collision. There is a risk of collision if the vessel 200 continues to navigate in the current direction along the planned route and enters the obstacle bumper area 602 of the obstacle 204.

In this embodiment, the collision risk calculator 15 determines the time required for the movable body bumper area 702 to enter the obstacle bumper area 602 based on the relative speeds of the vessel 200 and the obstacle 204 based on the speeds of the vessel 200 and the obstacle 204 and the distance between the vessel 200 and the obstacle 204.

The collision risk calculator 15 further calculates the collision risk associated with the obstacle 204 based on the time required for the movable body bumper area 702 to enter the obstacle bumper area 602. The collision risk associated with the obstacle 204 may be determined in a manner like the determination of the collision risk associated with the obstacle 204 described in FIGS. 6 to 11.

Further, with reference to FIG. 11, a determination of the necessity of a navigation route change will be described in which the distance from the evasion starting point of the planned route and the evasion route is taken into account in addition to the comparison of the maximum collision risk.

Figure 11:
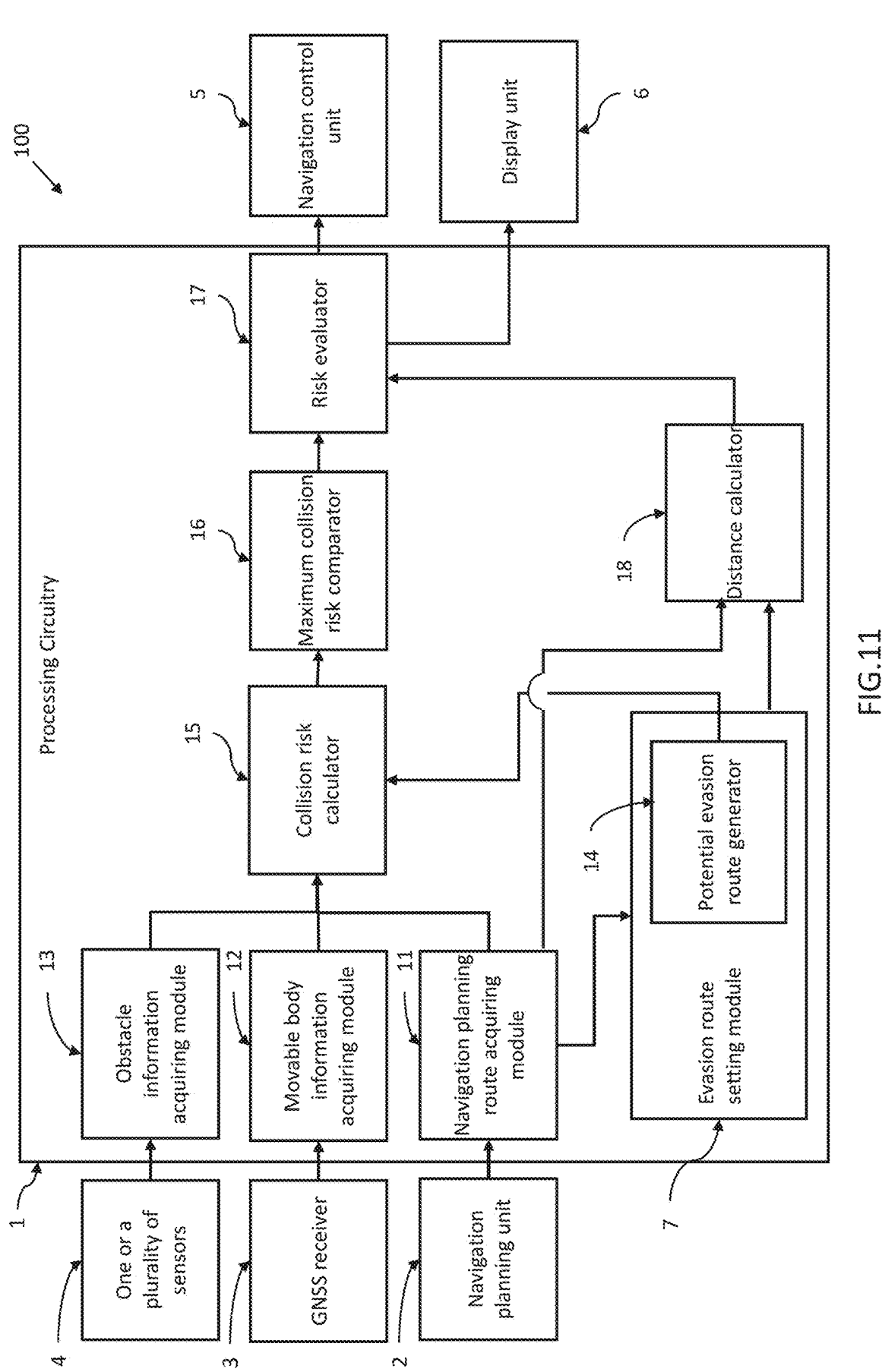
FIG. 11 is a diagram showing a configuration of another embodiment of the navigation planning system of the present invention, and is a block diagram showing the configuration with a distance calculator in addition to the configuration shown in FIG. 1.

FIG. 11 is a block diagram showing a configuration of another embodiment of the navigation planning system 100 of the present invention, which differs from the configuration of the embodiment shown in FIG. 1 in that the processing circuitry 1 includes a distance calculator 18. The distance calculator 18 obtains information about the route from each of the navigation planning route acquiring module 11 and the evasion route setting module 7. The distance calculator 18 further calculates the distance from the evasion starting point of each of the planned route and the evasion route.

The distance from the evasion starting point may be calculated for each of the planned route and the evasion route as the distance traveled by the vessel 200 when a predetermined time has elapsed since the start of the evasion. The return point at which the vessel 200 returns from the evasion route may be set on the planned route, and the distance between the evasion starting point and the return point may be calculated for each of the planned route and the evasion route.

As described above, the location of the evasion starting point may be set as the current location of the vessel 200, or it may be assumed that the planned route is located on an unnavigated route.

The calculation result of the distance described above is output to the risk evaluator, and the necessity of the navigation route change is determined in conjunction with the result of the comparison between the planned route output from maximum collision risk comparator 16 and the maximum collision risk of each of the evasion routes.

Figure 12:
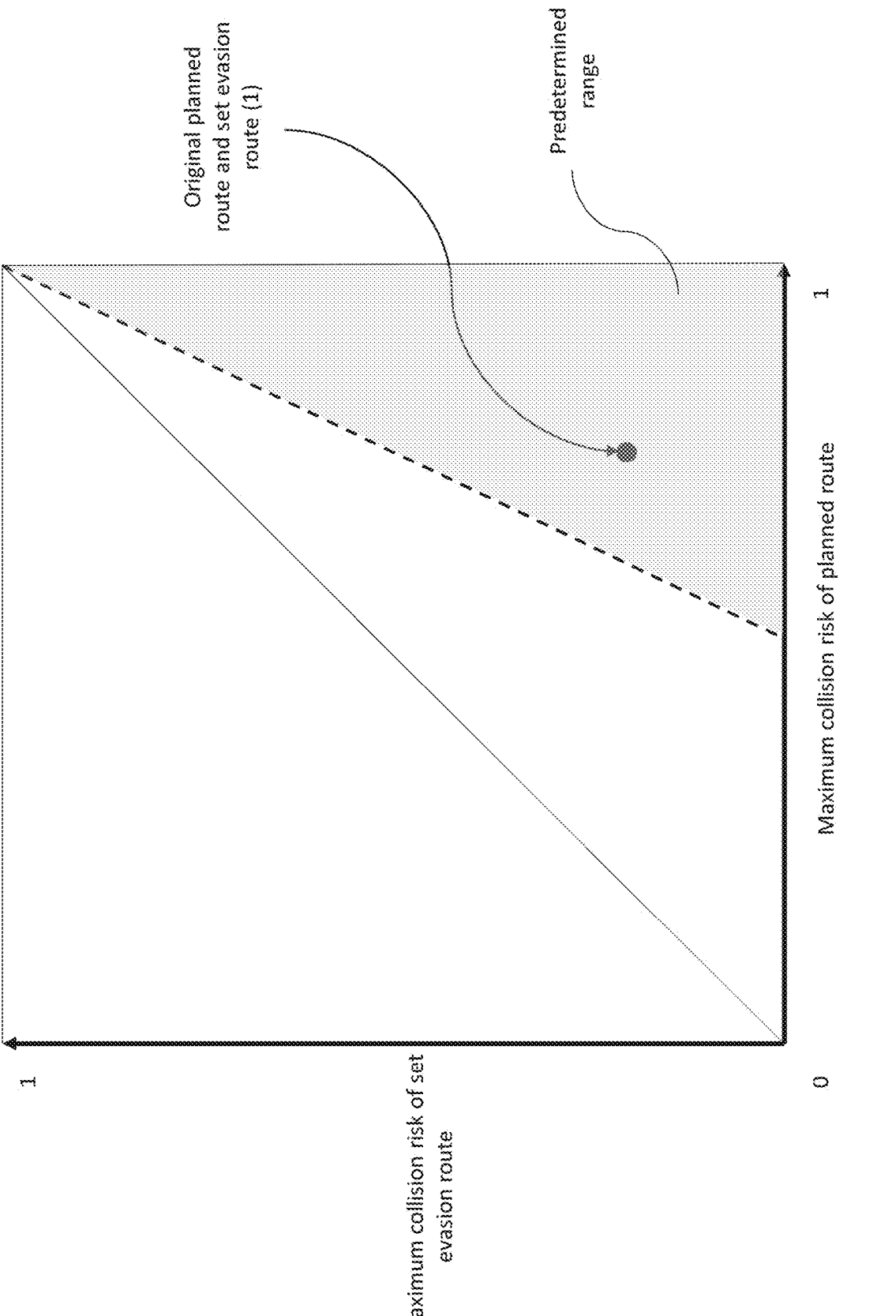
FIG. 12 is a diagram showing the relationship between the maximum collision risk when the vessel navigates the planned route and the maximum collision risk when the vessel navigates the evasion route in another embodiment of the navigation planning system of the present invention, and is a diagram showing that the maximum collision risk is within a predetermined base a second large range.
Figure 13:
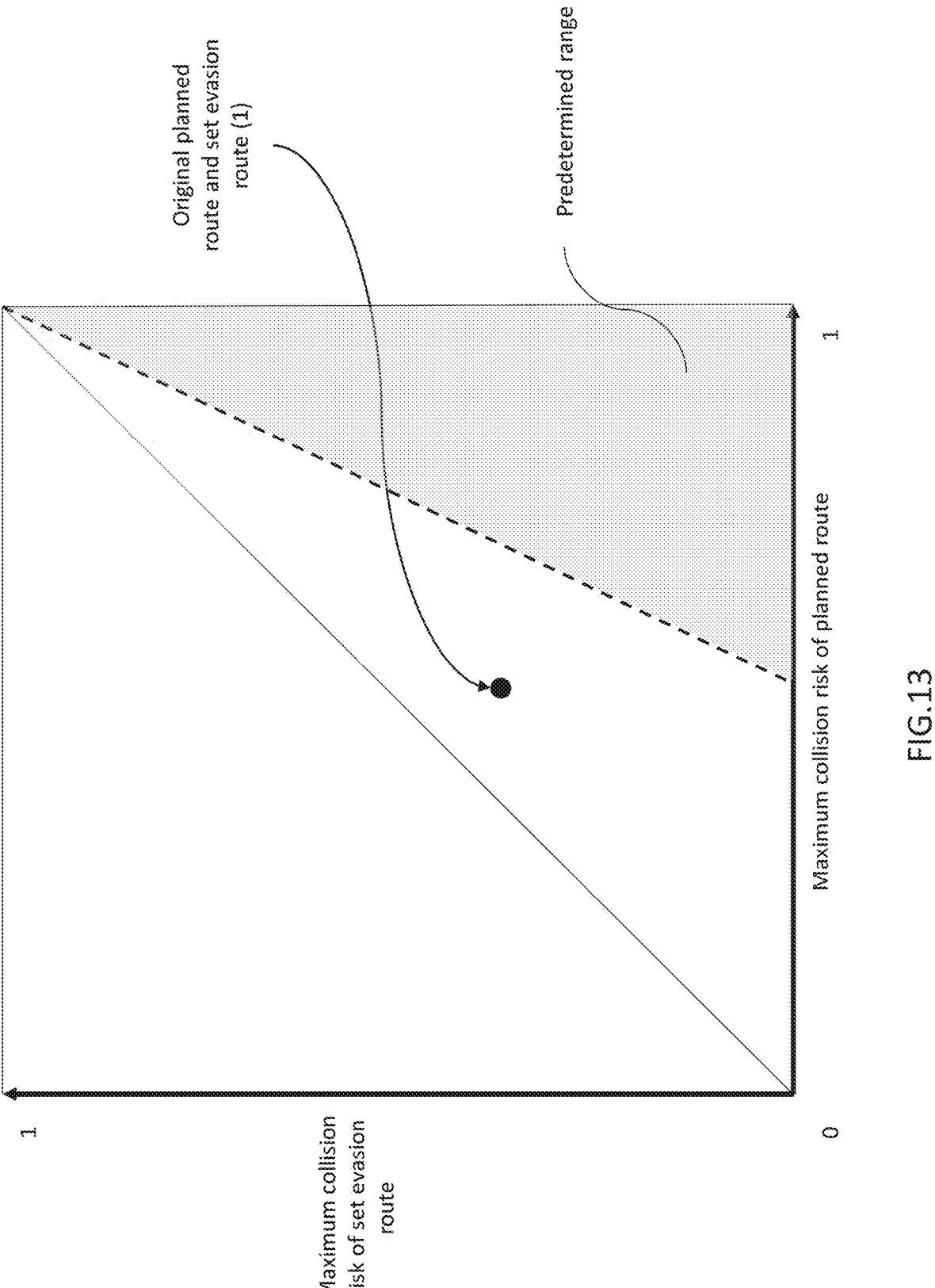
FIG. 13 is a diagram showing the relationship between the maximum collision risk when the vessel navigates the planned route and the maximum collision risk when the vessel navigates the evasion route in another embodiment of the navigation planning system of the present invention, and is a diagram showing that the maximum collision risk is outside the predetermined base the second large range.

FIGS. 12 and 13 are diagrams showing the relationship between the maximum collision risk when the vessel navigates the planned route and the maximum collision risk when the vessel navigates the evasion route in another embodiment of the navigation planning system of the present invention.

FIG. 12 shows that the position in the diagram showing the relationship between the two in a predetermined reference range. FIG. 13 shows that the position is outside the predetermined reference range. That is, the gray shaded area in the diagram shows an example of the predetermined reference range, and the relationship between the two indicated by a black circle is within the predetermined reference range. The reference range indicates that the maximum collision risk of the evasion route (1) set for the planned route is sufficiently low, and that it is better to switch the route to the evasion route (1) even if the difference between the congestion risk described later and the distance between the planned route and the evasion route (1) is large in order to ensure a higher level of safety if it is within the reference range.

On the other hand, in FIG. 13, the black circle indicating the relationship between the planned route maximum collision risk and the evasion route (2) maximum collision risk is located in the lower right area of the figure, i.e., the position where the risk is reduced, but is not within the base a second large range. That is, although the maximum collision risk can be reduced by changing the route to the evasion route (2), a large reduction like that of the evasion route (1) may not be expected.

In this case, the decision not to perform the navigation route change to the evasion route (2) may be made, but the necessity of the above decision may be made by taking further factors into consideration. In the positional embodiment shown in FIG. 11, the distance between the evasion starting point and the return point of the planned route and the evasion route is calculated, and this decision is also made in addition to the decision factors. Although the effect of risk reduction by performing navigation route change to the evasion route (2) is not large, there is an advantage that the planned route may be returned to the planned route at an early stage.

Figure 14:
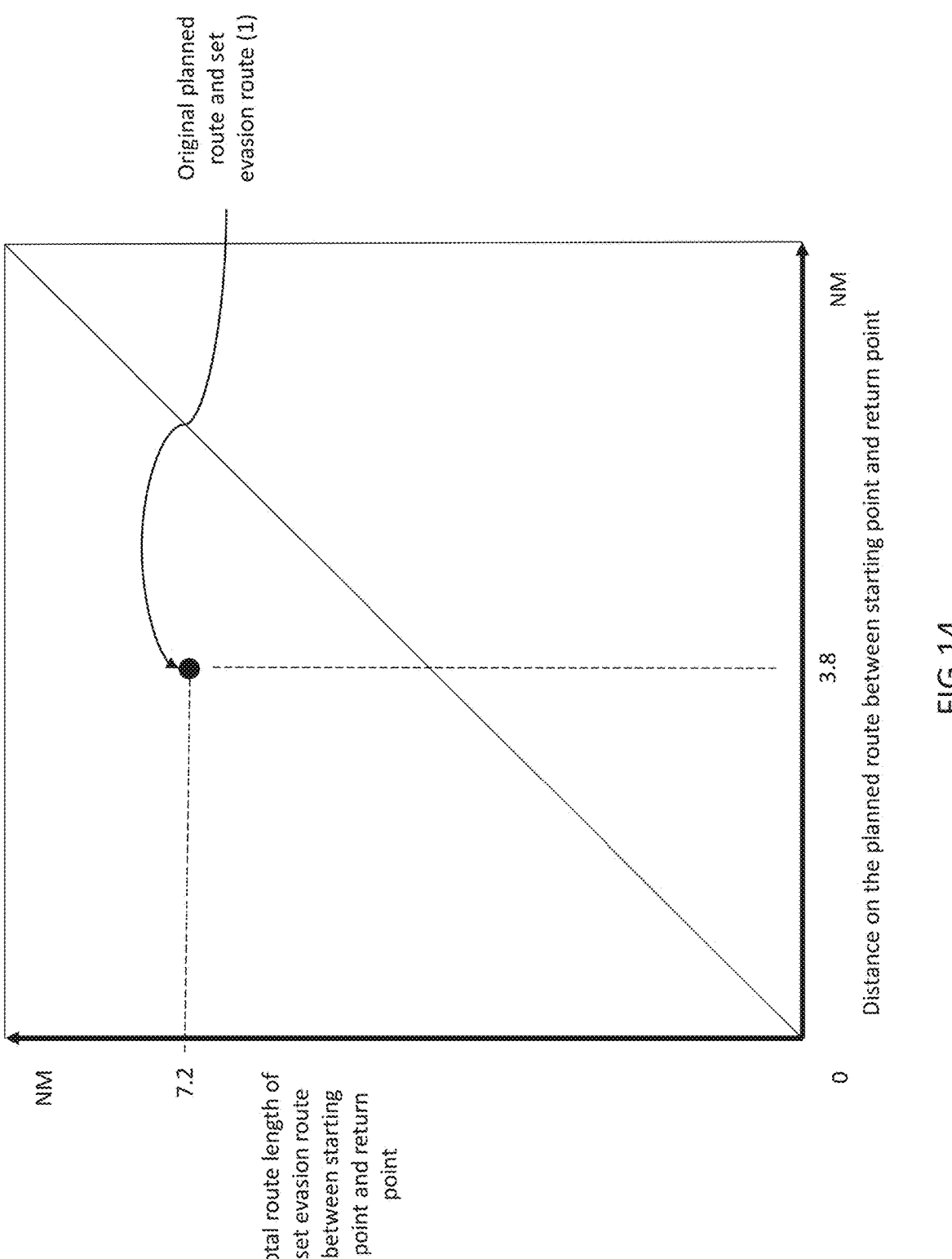
FIG. 14 is a diagram showing an example of the relationship between a distance from an evasion starting point to the return point when the vessel navigates the planned route and a distance from the evasion starting point to the return point when the vessel navigates the evasion route in another embodiment of the navigation planning system of the present invention.
Figure 15:
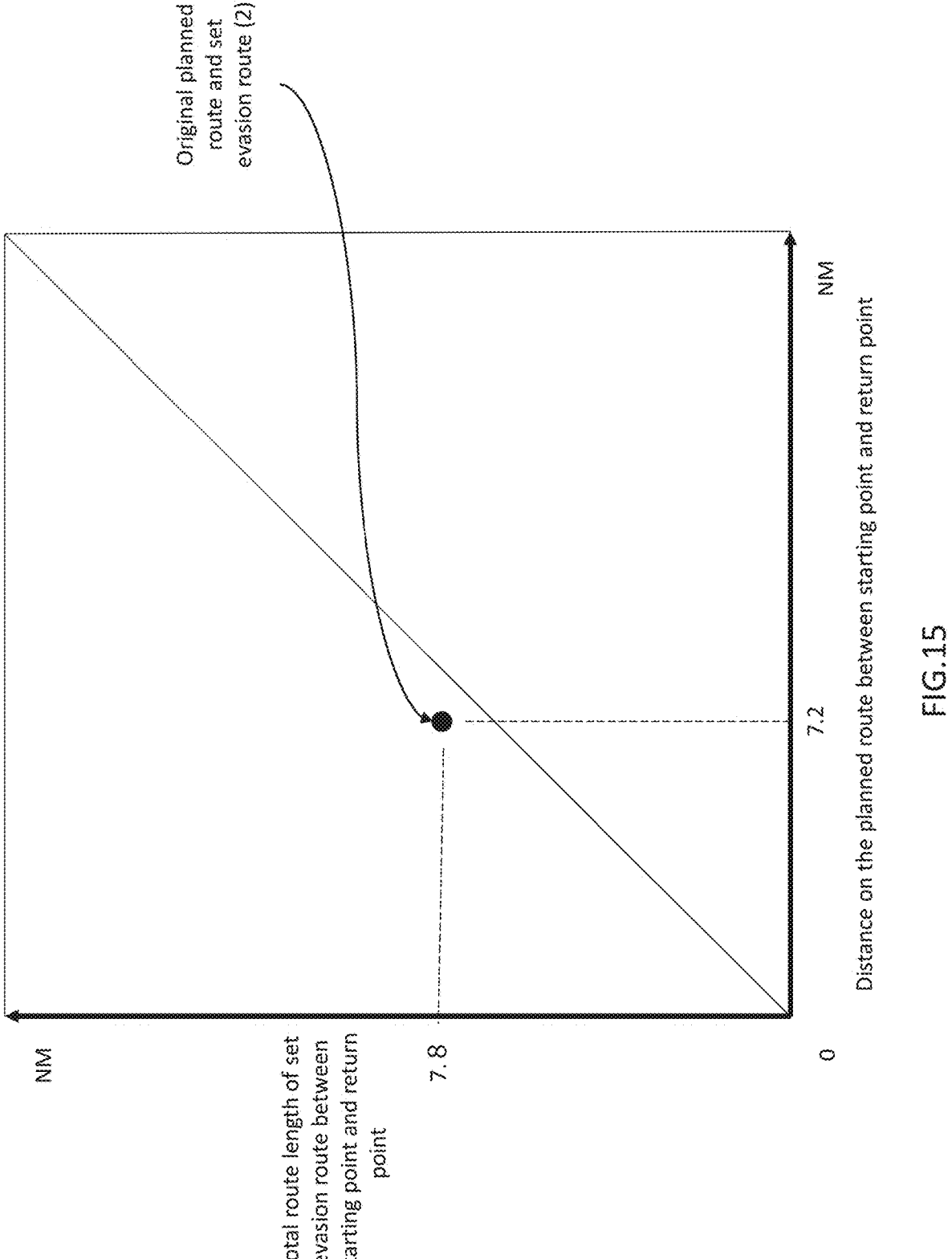
FIG. 15 is a diagram showing another example of the relationship between the distance from the evasion starting point to the return point when the vessel navigates the planned route and the distance from the evasion starting point to the return point when the vessel navigates the evasion route in another embodiment of the navigation planning system of the present invention.

Further, FIGS. 14 and 15 show the relationship between the distance on the planned route from the evasion starting point to the return point of the evasion route and the distance from the evasion starting point to the return point of the evasion route, that is, the total route length. In FIG. 14, an increase distance of the total route length (7.2 Nautical Mile) of the evasion route is 3.4 NM with respect to the distance on the planned route (3.8 NM), but the results shown in FIG. 15 show that the distance between the two routes is same. Therefore, it is possible to select the evasion route when the increase distance is small.

In the present embodiment, the planned route and the evasion route are respectively navigated for a predetermined time from the evasion starting point as an example, but the return point of the vessel 200 may be set on the planned route in advance to calculate the distance when the planned route and the evasion route are navigated respectively.

In the above case, it is considered that the planned route may have a shorter distance than the evasion route, but the evasion route may have a shorter distance than the planned route, and in this case, it is needless to say that the decision to change to the evasion route may be made if the above conditions are satisfied.

Further, a configuration in which the congestion risk is added to the determination of the necessity of the navigation route change in the navigation planning system 100 of the present invention will be described with reference to FIGS. 16 and 17.

In the present embodiment, as shown in FIG. 16, the configuration is different from that of the embodiment shown in FIG. 1 in that the processing circuitry 1 includes a congestion risk calculator 19 and a congestion risk comparator 20 are provided, and the result is used for the determination of the necessity of the risk evaluator.

Figure 17:
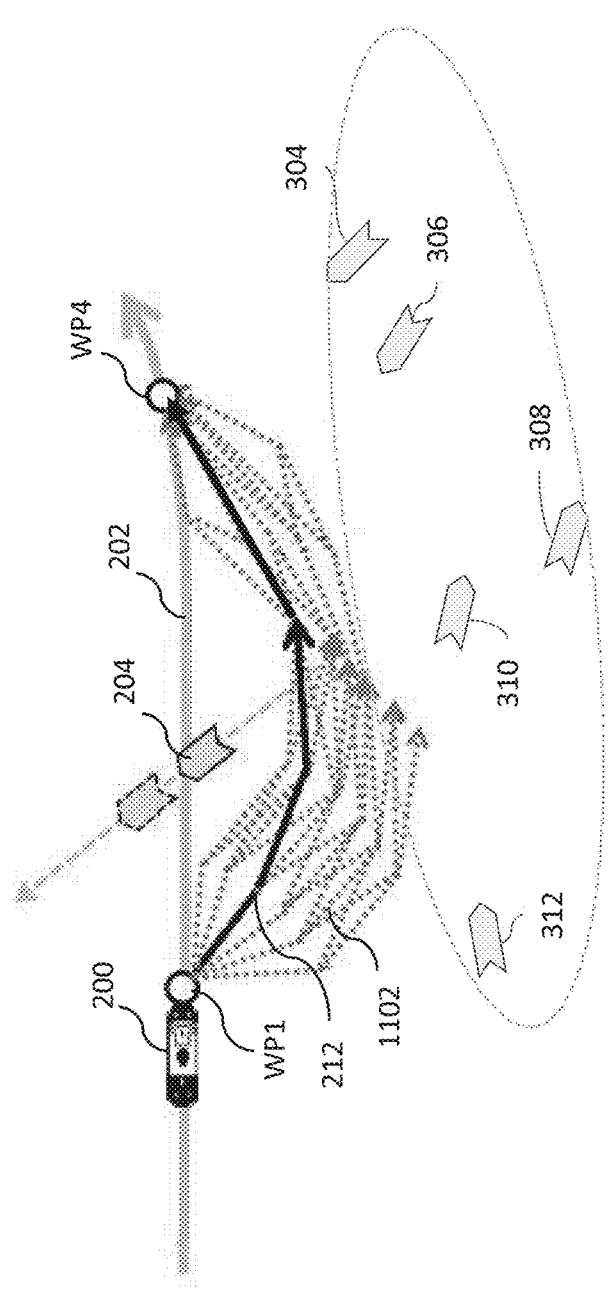
FIG. 17 is a diagram showing an example of a state where the vessel and a plurality of other vessels around the vessel exist in yet another embodiment of the navigation planning system of the present invention.

The congestion risk calculator 19 is operatively connected to the collision risk calculator 15 and is configured to communicate with the collision risk calculator 15 to receive a plurality of the collision risks for the plurality of the obstacle (the other vessel) 204 and other obstacles (the other vessels) 304 to 312 along the planned route 202 shown in FIG. 17.

The congestion risk calculator 19 is configured to determine the congestion risk associated with the planned route 202 along the current route direction based on the plurality of the collision risks. The congestion risk indicates the degree of simultaneous approach of the obstacle included in the congestion risk area based on the collision risk corresponding to each of the obstacles included in the obstacle in the congestion area.

The congestion risk calculator 19 determines the congestion risk corresponding to the planned route 202 based on a value of the logical sum of the collision risks as an example of the calculation corresponding to the plurality of the obstacles 204 and the obstacles 304 to 312. In this embodiment, the congestion risk calculator 19 determines the congestion risk of the planned route 202 based on the value of the logical sum of the plurality of the collision risks excluding the maximum collision risk, that is, the collision risk for the obstacle 204, among the plurality of the collision risks.

The term "logical sum" as used herein refers to a logical sum based on the logic that is true when one or both of two propositions in a logical operation are true and false when both are false, that is, the logical sum of a logical circuit or a binary numeric value has an output of 1 when one or both of the two inputs are 1 and 0 when both are 0. For example, if there are 4 obstacle Obs (1), Obs (2), Obs (3), and Obs (4), and the collision risk is 0.3, 0.5, 0.7, and 0.9, respectively, the collision risk of maximum is 0.9 of Obs (4), and the logical sum of 3 Obs (1) through Obs (3) excluding them is 0.7.

On the other hand, for the cases other than the obstacle with the maximum collision risk, the collision risk caused by the degree of simultaneous approach, that is, the congestion risk, is evaluated. In order to do this, for the set of obstacles with the collision risk other than maximum collision risk, the collision risk is input by the congestion risk calculator 19, and the congestion risk is calculated.

In the present embodiment, the collision risk associated with the obstacle having the maximum collision risk is evaluated individually, and may be excluded. When the congestion risk is calculated excluding the obstacle having the maximum collision risk, the congestion risk is calculated appropriately by including the obstacle having a second large maximum risk value following the maximum risk value.

In evaluating the collision risk, it is better to calculate the congestion risk based on the collision risk of one or more other obstacles excluding the obstacle having the maximum collision risk, and evaluate the maximum collision risk and the congestion risk separately. In one embodiment, the priority is given to avoiding collisions with the obstacle having the maximum collision risk.

Furthermore, consider that other collision risks, such as collision risks with the obstacle including the obstacle having the second large maximum collision risk, which is the next highest the collision risk, when performing collision avoidance. The configuration shown in FIG. 16 is a configuration according to this. However, the maximum collision risk may be included in the calculation of the congestion risk.

In FIG. 17, the evasion starting point WP1 and the return point WP4 may be arbitrarily set for each potential evasion route if they are on the planned route 202. With regards to the evasion starting point WP1, for example, if the collision risk is increased, the position where the vessel is currently sailing may be set to the evasion starting point WP1, and the like. The position of the return point WP4 may be determined according to a distance setting policy of the evasion route, as described later.

Further, another embodiment of the navigation planning system of the present invention will now be described with reference to FIG. 18.

Figure 18:
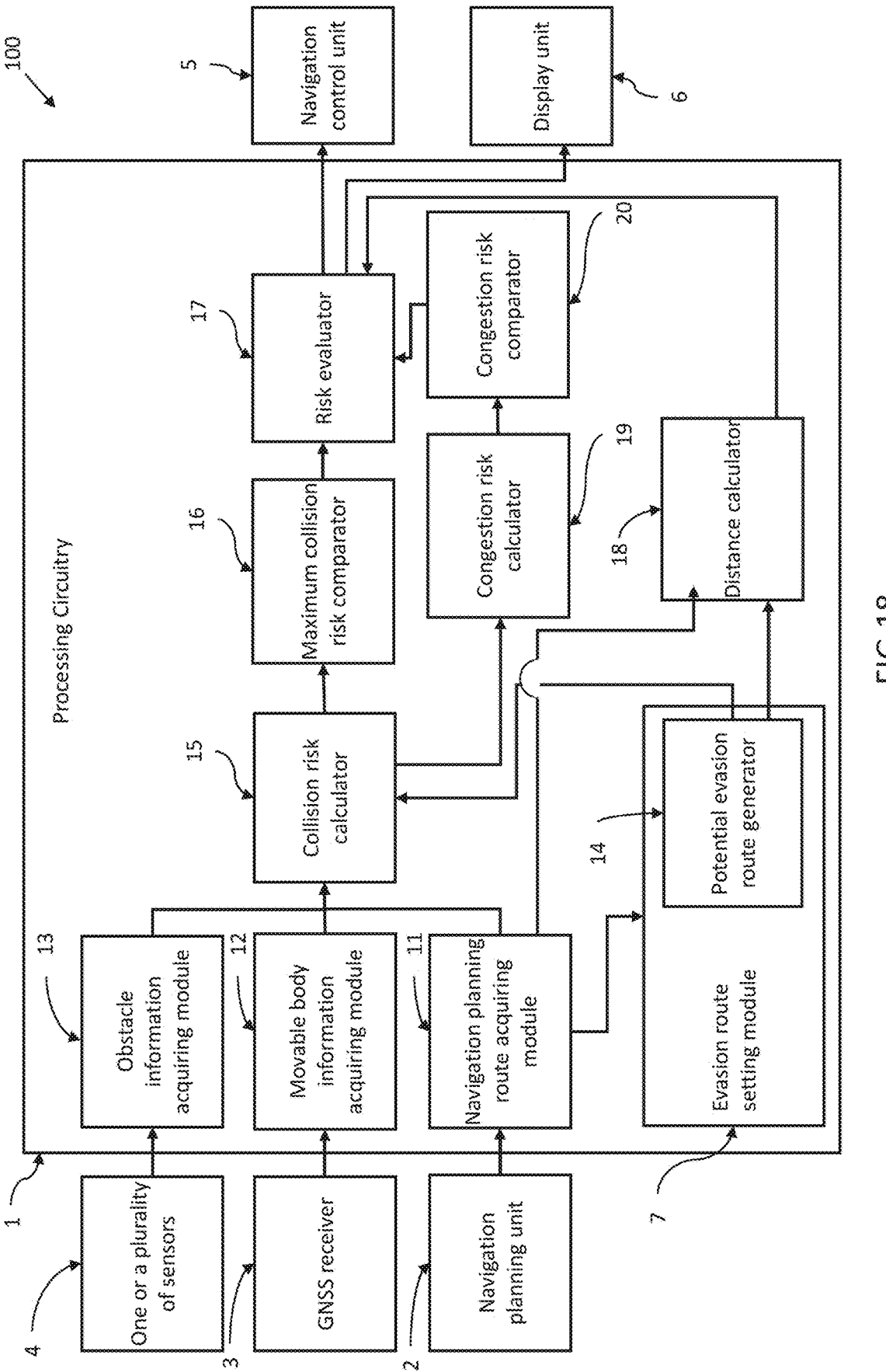
FIG. 18 is a diagram showing a configuration of yet another embodiment of the navigation planning system of the present invention, and is a block diagram showing a configuration including the congestion risk calculator, the congestion risk comparator, and the distance calculator for the configuration shown in FIG. 1.

An embodiment of the navigation planning system of the present invention shown in FIG. 18, the processing circuitry 1 includes the distance calculator 18 provided in the embodiment shown in FIG. 11, and the congestion risk calculator 19 and the congestion risk comparator 20 provided in the embodiment shown in FIG. 16. The risk evaluator 17 collectively determines the navigation route change with respect to the result of the comparison between the maximum risk value comparator 16 shown at the beginning, the result of the comparison between the congestion risk comparator 20, and the difference between the distances of the planned route and the evasion route calculated by the distance calculator 18.

Figure 19:
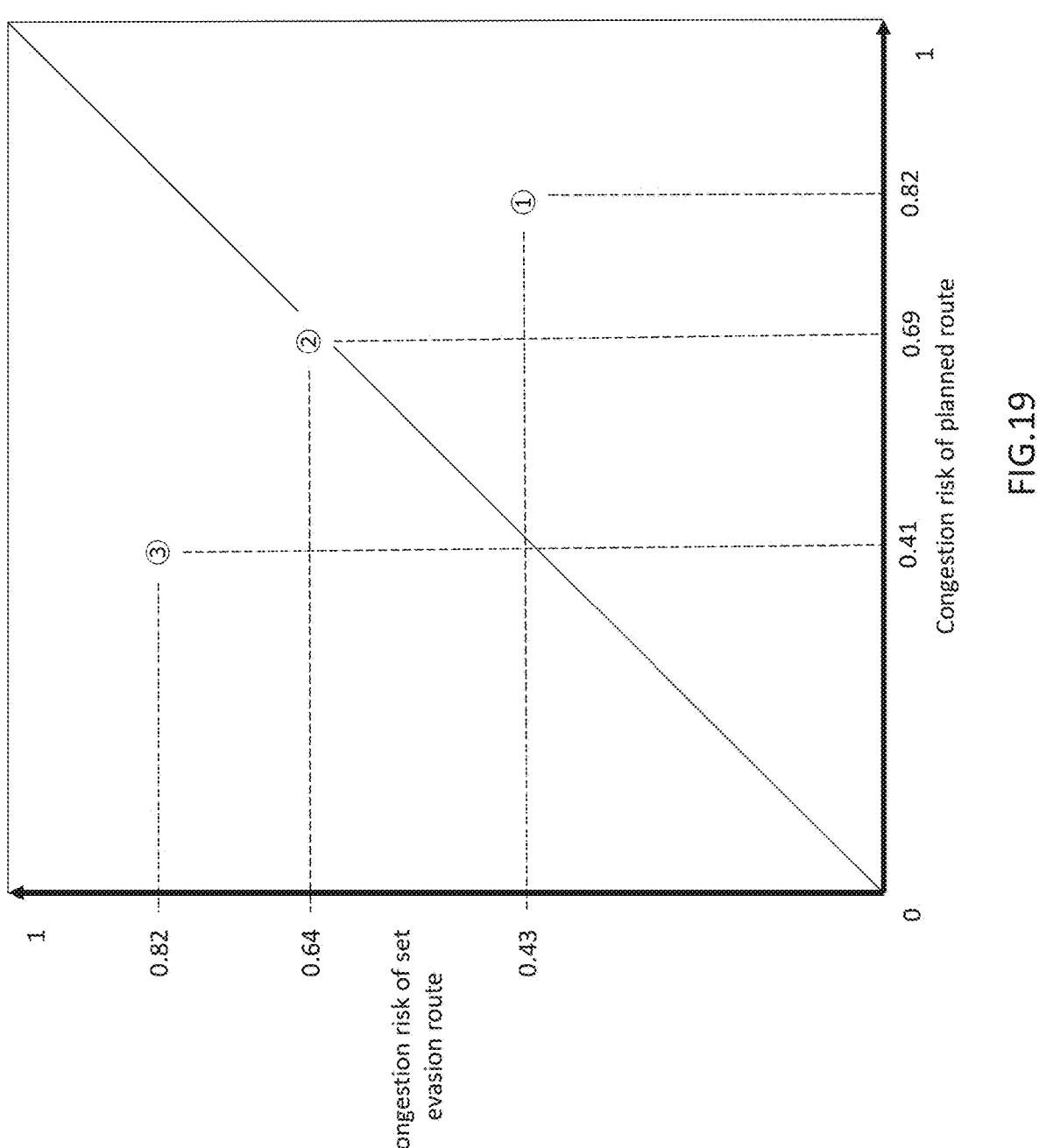
FIG. 19 is a diagram showing a relationship between the congestion risk when the vessel navigates the planned route and the congestion risk when the vessel navigates the evasion route in another embodiment of the navigation planning system of the present invention.

FIG. 19 is a diagram showing the relationship between the congestion risk when the vessel 200 navigates on the planned route and the congestion risk when the vessel 200 navigates on the evasion route, and similarly to the maximum collision risk, the relationship is divided into 3 relationships of 1-3 according to the size of the values of both.

Figure 20:
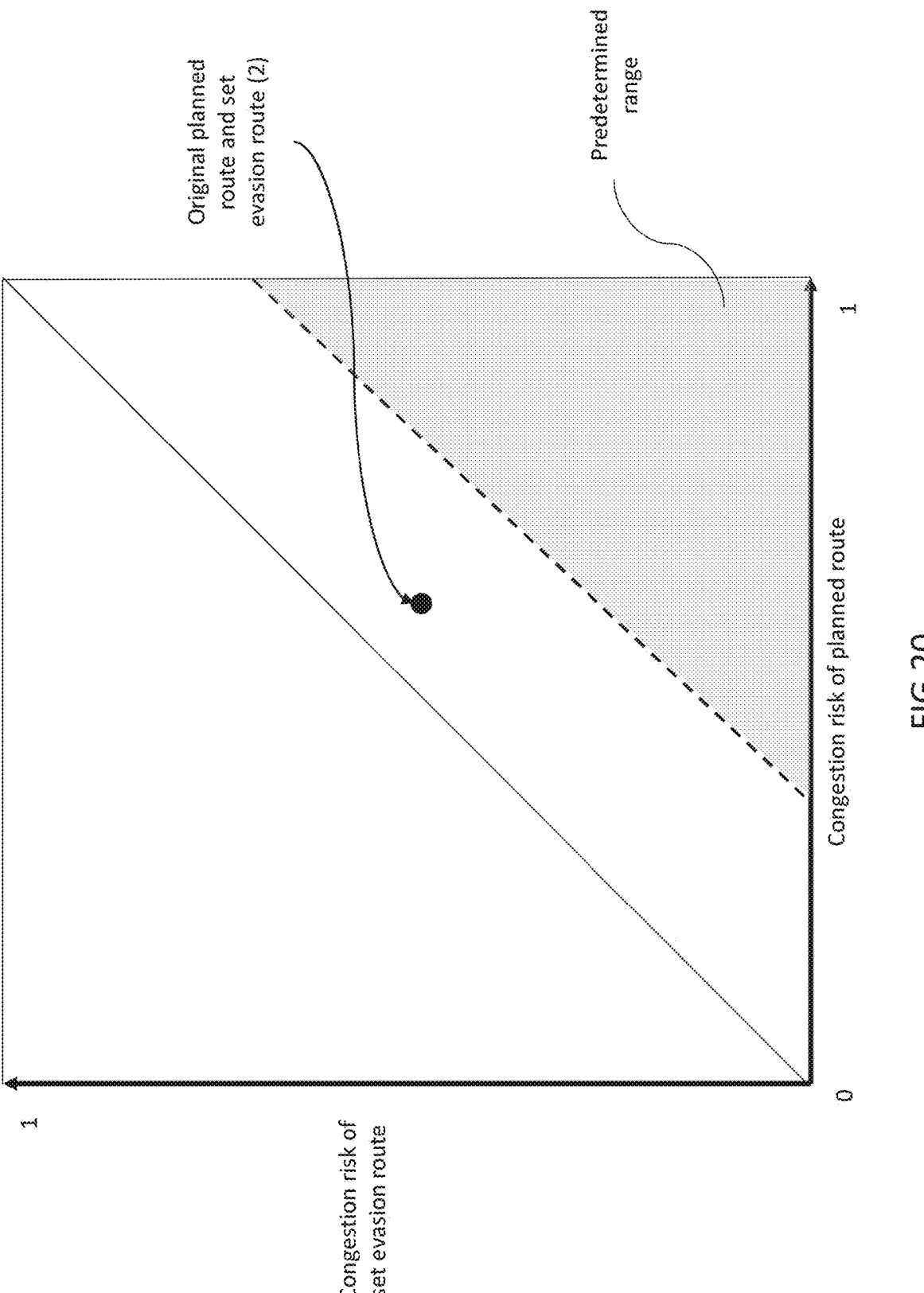
FIG. 20 is a diagram showing the relationship between the congestion risk when the vessel navigates the planned route and the congestion risk when the vessel navigates the evasion route in another embodiment of the navigation planning system of the present invention and is a diagram showing that the vessel is outside the predetermined base second large range.

FIG. 20 divides the region in the above relationship into a predetermined base the second large range in which the degree of improvement of the congestion risk of the evasion route relative to the planned route is large, i.e., the numerical value of the risk is significantly reduced, a region in which the degree of improvement is not expected to be significant but the risk value is reduced (both in the lower right half), and a region in the upper left corner in which the degree of improvement is not expected but rather the risk value is increased.

For example, when the maximum collision risk of the evasion route is in the predetermined base the second large range in FIG. 12 and the congestion risk is also located in the predetermined base the second large range shown in the lower right corner of FIG. 20, it may be determined that the navigation route changes to the evasion route regardless of the distance.

On the other hand, when the maximum collision risk of the evasion route is not within the predetermined range and a large improvement in the collision risk is not expected, it may be possible to determine the necessity of the navigation route change by referring to the difference in the distance. Specifically, although the maximum collision risk or the congestion risk of the evasion route is improved, it is possible to set a route plan according to the type in which a navigation route change to the evasion route is performed if the evasion route is capable of a so-called short return, which is possible to return to the planned route early, although no significant improvement is expected.

Table 1 shows an example of the classification of the types for three evaluation factors maximum collision risk, the congestion risk, and the difference between the distance of the planned route and the evasion route. In this way, the navigation planning system of the present invention can flexibly set the route by appropriately evaluating the collision risk for the evasion route and considering the distance of the evasion route.

TABLE 1

| Type | Maximum collision risk | Congestion risk | Difference of distance* | Navigation route change signal |
|---|---|---|---|---|
| — | Risk of evasion route is greater than that of planned route | — | — | No output signal (route cannot be changed) |
| — | Risk of evasion route is smaller and outside the predetermined range | Risk of evasion route is greater than that of planned route | — | No output signal (route cannot be changed) |
| — | | Risk of evasion route is smaller and within the predetermined range | Increase in the distance when changing to the evasion route is more than the predetermined range | No output signal (route cannot be changed) |
| Short return | | Risk of evasion route is smaller and outside the predetermined range | Increase in distance when switching to evasion route is within prescribed range | Signal output as short return evasion route (short evasion route can be changed) |
| Focus on risk evasion | | Risk of evasion route is smaller and outside the predetermined range | — | Signal output regardless of distance of evasion route (route can be changed) |
| Focus on risk evasion | Risk of evasion route is smaller and within the predetermined range | — | — | Signal output regardless of distance of evasion route (route can be changed) |

As shown in Table 1, * difference between the distance between the evasion starting point and the return point on the planned route and the distance between the evasion starting point and the return point on the evasion route Therefore, the navigation planning system 100 of the present invention enables the vessel operator, that is, the operator who operates the vessel, to further safely navigate the vessel 200 by avoiding collision with a plurality of surrounding obstacles such as the other vessels, terrain, etc., in the planned route (the planned route 202 or the evasion route 212) displayed on the screen of the display unit 6 and the evasion route (the evasion route 212 or the other evasion route) generated.

Further, the navigation planning method based on the configuration of the route plan described so far will be described with reference to FIGS. 21 and 22.

As shown in FIG. 21, at step 1202, the planned route indicating the route from the starting point (i.e., current location) of the movable body (own vessel) to the destination point is set or received from outside. Further, at step 1204, the evasion starting point on the planned route of the movable body (own vessel) and the evasion route starting from the starting point are set or received from the outside.

At step 1206, the movable body information including the position, the moving direction, and speed of the movable body 200 is acquired. At step 1208, the obstacle information including the position, the moving direction, and the speed of one or more of the obstacles (i.e., the other vessels) is acquired.

At step 1210, the collision risk for each of the obstacles (i.e., the other vessels) is calculated for each of the planned route and the evasion route based on the movable body information and the obstacle information. At step 1212, the maximum collision risk of the planned route and the maximum collision risk of the evasion route are calculated.

Figure 22:
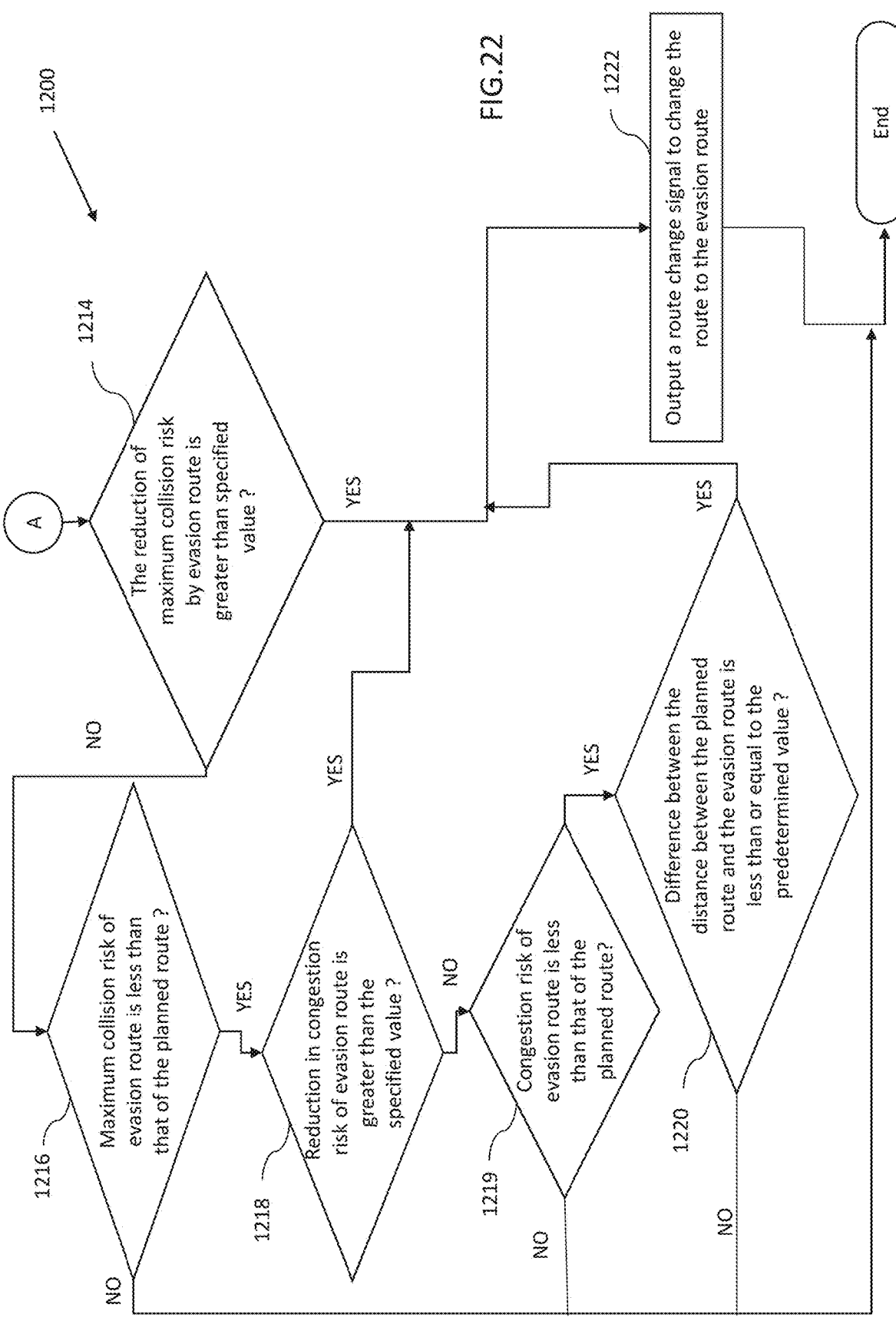
FIG. 22 is a flowchart showing a process in an embodiment of the navigation planning method of the present invention shown in FIG. 21.

As shown in FIG. 22, at step 1214, the maximum collision risk of the evasion route is compared with the maximum collision risk of the planned route to determine whether the collision risk of the evasion route is significantly improved with respect to the planned route, that is, whether the maximum collision risk is reduced more than prescribed, and the degree of improvement is determined. When it is improved, the process proceeds to step 1222 and outputs a route switching signal i.e., a navigation route change signal, for changing the route to the evasion route. Further, the route plan of the own vessel may be indicated by the switching signal, or direct navigation control such as steering control may be performed by the navigation route change signal. In one embodiment, the navigation route change signal is generated when the maximum collision risk of the evasion route is less than the maximum collision risk of the planned route.

On the other hand, at step 1216, when the maximum collision risk of the evasion route is greater than the maximum collision risk of the planned route, and no reduction in the collision risk is achieved. Therefore, the evasion route is not adopted and terminated.

When the maximum the collision risk of the evasion route is equal to or less than the maximum the collision risk of the planned route, the congestion risk of the evasion route is compared with the congestion risk of the planned route at step 1218. When the risk is significantly reduced, that is, within a predetermined reference area, a navigation route change signal is output to change the route to the evasion route.

At step 1219, when the congestion risk of evasion route is less than that of the planned route, it goes to step 1220. When the congestion risk is not reduced by changing to the evacuation route, it skips to the end without outputting the navigation route change signal Even when there is no significant improvement in the congestion risk, at step 1220, the distance between the planned route and the evasion route is compared, a difference or a distance ratio is calculated, and when it is within a predetermined range, a navigation route change signal for changing the route to the evasion route is output. In one embodiment, the difference between an evasion route distance and a planned route distance is determined, or the distance ratio between the evasion route distance and the planned route distance is determined. The navigation route change signal is outputted when the difference or the distance ratio is equal to or less than a predetermined value.

Although the above is a description of embodiments of the navigation planning system and the navigation planning method of the present invention, various exemplary logical blocks and parts described in connection with the embodiments of the invention shown herein may be implemented or executed by a machine such as a processor.

The processor may be a microprocessor, a controller, a microcontroller, a state machine, or a combination thereof. The processor may include an electrical circuit configured to process executable instructions of the computer. In another embodiment, the processor may include an application-specific integrated circuit (ASIC), a field programmable gate array (FPGA), or other programmable device that performs logical operations without processing executable instructions of the computer.

The processor may also be implemented as a combination of computing devices, for example, a combination of a digital signal processor (DSP) and a microprocessor, a plurality of microprocessors, one or more microprocessors combined with a DSP core, or other such configuration.

Although mainly digital technologies are discussed here, the processor may include mainly analog components. For example, some or all of the signal processing algorithms described herein may be implemented by analog circuits or mixed analog and digital circuits.

The computing environment may include any type of computer system including, but not limited to, a microprocessor, mainframe computer, digital signal processor, portable computing device, device controller, or computer system based on a computing engine within the device.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A navigation planning system, comprising:
a processing circuitry configured to:
acquire a planned route for a movable body on a water;
acquire movable body information including a position, a moving direction, and a speed of the movable body;
acquire obstacle information including a position, a moving direction, and a speed of an obstacle located in a surrounding area of the movable body;
generate a plurality of potential evasion routes, different from the planned route, each comprising a starting point located on the planned route and a return point located on the planned route;
select an evasion route from among the plurality of potential evasion routes;
calculate a collision risk indicating a risk level of collision between the movable body and the obstacle based on the movable body information and obstacle information;
obtain a maximum evasion route collision risk when the movable body travels on the evasion route, and a maximum planned route collision risk when the movable body travels on the planned route;
compare the maximum evasion route collision risk with the maximum planned route collision risk; and
output a navigation route change signal to cause the movable body to change the planned route to the evasion route when the maximum evasion route collision risk is less than the maximum planned route collision risk,
wherein the processing circuitry further configured to:
calculate a planned route distance travelled by the movable body for a predetermined time on the planned route and an evasion route distance travelled by the movable body for a predetermined time on the evasion route respectively;
determine whether to output the navigation route change signal based on the maximum evasion route collision risk and the maximum planned route collision risk, and the planned route distance and the evasion route distance; and
output the navigation route change signal when one of a difference between the evasion route distance and the planned route distance is within a predetermined value, and a distance ratio between the evasion route distance and the planned route distance is equal to or less than a predetermined value.

2. The navigation planning system according to claim 1, wherein:
the processing circuitry is further configured to set the evasion route different from the planned route for a part of or an entire unnavigated route of the planned route when the risk evaluator determines a necessity of the evasion route.

3. The navigation planning system according to claim 1, wherein the starting point is a future position of the movable body calculated from a current navigational position of the movable body moving along the planned route.

4. The navigation planning system according to claim 1, wherein the processing circuitry further configured to:
calculate the maximum evasion route collision risk when the movable body travels along the evasion route from the starting point to the return point; and
select the potential evasion route, as the evasion route, having the maximum evasion route collision risk that is minimum among the plurality of potential evasion routes.

5. The navigation planning system according to claim 1, wherein the evasion starting point is a current navigational position of the movable body moving along the planned route.

6. A navigation planning method, comprising:

acquiring a planned route for a movable body on a water;

acquiring movable body information including a position, a moving direction, and a speed of the movable body;

acquiring obstacle information including a position, a moving direction, and a speed of an obstacle located in a surrounding area of the movable body;

generating a plurality of potential evasion routes, different from the planned route, each comprising a starting point located on the planned route and a return point located on the planned route;

selecting an evasion route from among the plurality of potential evasion routes;

calculating a collision risk indicating a risk level of collision between the movable body and the obstacle based on the movable body information and obstacle information;

obtaining a maximum evasion route collision risk when the movable body travels on the evasion route and a maximum planned route collision risk when the movable body travels on the planned route, calculated by the collision risk calculator respectively;

comparing the maximum evasion route collision risk with the maximum planned route collision risk;

outputting a navigation route change signal to cause the movable body to change the planned route to the evasion route when the maximum evasion route collision risk is less than the maximum planned route collision risk;

calculating a planned route distance travelled by the movable body for a predetermined time on the planned route and an evasion route distance travelled by the movable body for a predetermined time on the evasion route respectively;

determining whether to output the navigation route change signal based on the maximum evasion route collision risk and the maximum planned route collision risk, and the planned route distance and the evasion route distance; and outputting the navigation route change signal when one of a difference between the evasion route distance and the planned route distance is within a predetermined value, and a distance ratio between the evasion route distance and the planned route distance is equal to or less than a predetermined value.

7. The navigation planning method according to claim 6, further comprising:

calculating the maximum collision risk when the movable body travel along the evasion route from the evasion starting point to the return point; and selecting the potential evasion route, as the evasion route, having the maximum collision risk minimum among the plurality of potential evasion routes.

8. The navigation planning system according to claim 1, wherein the processing circuitry further configured to:

output the navigation route change signal when a difference between the maximum planned route collision risk and the maximum evasion route collision risk is greater than a predetermined value; and determine whether to output the navigation route change signal based on the difference between the evasion route distance and the planned route distance when the difference between the maximum planned route collision risk and the maximum evasion route collision risk is within the predetermined value.

9. The navigation planning system according to claim 1, wherein the processing circuitry further configured to:

calculate a congestion risk indicating a degree of approaching a plurality of obstacles simultaneously based on each of the collision risk between the movable body and the obstacle;

obtain a maximum evasion route congestion risk when the movable body travels on the evasion route and a maximum planned route congestion risk when the movable body travels on the planned route, calculated by the congestion risk calculator respectively;

compare the maximum evasion route congestion risk with the maximum planned route congestion risk; and output the navigation route change signal when the maximum evasion route collision risk is less than the maximum planned route collision risk, and the maximum evasion route congestion risk is less than the maximum planned route congestion risk.

10. The navigation planning system according to claim 9, wherein the processing circuitry further configured to:

calculate the congestion risk of the planned route based on a logical sum of a plurality of collision risks.

11. The navigation planning system according to claim 9, wherein the processing circuitry further configured to:

calculate the congestion risk based on the collision risks including the maximum collision risk among the plurality of collision risks.

12. The navigation planning system according to claim 9, wherein the processing circuitry further configured to:

the congestion risk calculator further configured to calculate the congestion risk based on the collision risks including a second large collision risk among the plurality of collision risks excluding the maximum collision risk.

13. The navigation planning method according to claim 7, further comprising:

calculating a congestion risk indicating a degree of approaching a plurality of obstacles simultaneously based on each of the collision risk between the movable body and the obstacle;

obtaining a maximum evasion route congestion risk when the movable body travels on the evasion route and a maximum planned route congestion risk when the movable body travels on the planned route, calculated by the congestion risk calculator respectively;

comparing the maximum evasion route congestion risk with the maximum planned route congestion risk; and outputting the navigation route change signal when the maximum evasion route collision risk is less than the maximum planned route collision risk, and the maximum evasion route congestion risk is less than the maximum planned route congestion risk.

* * * * *